US012670372B2

(12) United States Patent
Sharma et al.

(10) Patent No.: US 12,670,372 B2
(45) Date of Patent: Jun. 30, 2026

(54) METHOD AND SYSTEM FOR FEATURE-MAPS ALLOCATION IN SYSTEM-CACHE USING PRIORITIZED LINEAR SCAN FOR NEURAL NETWORK ACCELERATION

(71) Applicant: SAMSUNG ELECTRONICS CO., LTD., Suwon-si (KR)

(72) Inventors: Rahul Sharma, Bengaluru (IN); Gourav Chatterjee, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 1225 days.

(21) Appl. No.: 17/559,167

(22) Filed: Dec. 22, 2021

(65) Prior Publication Data

US 2022/0222511 A1 Jul. 14, 2022

(30) Foreign Application Priority Data

Dec. 22, 2020 (IN) .............................. 202041055826
Dec. 16, 2021 (IN) .............................. 202041055826

(51) Int. Cl.
*G06N 3/063* (2023.01)
(52) U.S. Cl.
CPC ..................................... *G06N 3/063* (2013.01)
(58) Field of Classification Search
CPC ............. G06N 3/063; G06N 3/04; G06N 3/08
See application file for complete search history.

(56) References Cited

U.S. PATENT DOCUMENTS 7,000,072 B1 * 2/2006 Aisaka .................. G06F 12/084
711/E12.07
7,343,046 B2 3/2008 Curry et al.
(Continued)

FOREIGN PATENT DOCUMENTS

CN 102473140 A 5/2012
CN 110569970 A 12/2019
(Continued)

OTHER PUBLICATIONS

Aho, A. V., S ethi, R., and Ullman, J. D. 1986. Compilers: Principles, Techniques, and Tools. Addison Wesley, Reading, MA.
(Continued)

*Primary Examiner* — Kamran Afshar
*Assistant Examiner* — Brian J Hales
(74) *Attorney, Agent, or Firm* — Fish & Richardson P.C.

(57) ABSTRACT

A method and system for allocation of feature-maps in a system cache in a DRAM includes receiving input feature maps associated with data at the system cache, and then creating clusters of spatially co-located features maps and calculating a priority of each of the clusters based on one or more cluster parameters. The method further includes placing the clusters based on the execution order and the calculated priorities of each of the clusters to obtain a prioritized plurality of the clusters. Thereafter, a first address is assigned to each of the prioritized clusters and then an overlap is determined of assignment of addresses to each of consecutive clusters of the prioritized clusters based on a conflict of life parameter. The method further includes reassigning a second address to each of the prioritized clusters based on a determination result and the calculated priorities of each of the clusters.

10 Claims, 20 Drawing Sheets

Deep Neural Network with multiple layers

(56) References Cited

U.S. PATENT DOCUMENTS

| | | | |
|---|---|---|---|
| 9,280,466 | B2 | 3/2016 | Kunimatsu et al. |
| 9,971,514 | B2 | 5/2018 | Sivasankaran et al. |
| 10,726,514 | B2 | 7/2020 | Ould-Ahmed-Vall et al. |
| 10,782,897 | B2 * | 9/2020 | Sekiyama .............. G06N 3/084 |
| 10,871,964 | B2 | 12/2020 | Turakhia et al. |
| 11,593,644 | B2 | 2/2023 | Miniskar et al. |
| 2018/0032859 | A1 | 2/2018 | Park et al. |
| 2018/0246669 | A1 | 8/2018 | Redern et al. |
| 2018/0322386 | A1 | 11/2018 | Sridharan et al. |
| 2019/0286086 | A1 | 9/2019 | Gardner et al. |
| 2019/0347549 | A1 * | 11/2019 | Phanishayee .......... G06N 3/084 |
| 2020/0065251 | A1 * | 2/2020 | Chao ...................... G06N 3/063 |

FOREIGN PATENT DOCUMENTS

| | | | |
|---|---|---|---|
| CN | 111052149 | A | 4/2020 |
| CN | 111091183 | A | 5/2020 |
| IN | 202011029150 | A | 8/2020 |
| TW | 201824095 | A | 7/2018 |
| TW | 201935408 | A | 9/2019 |

OTHER PUBLICATIONS

Briggs, P., Cooper, K., and Torczon, L. 1994. Improvements to graph coloring register allocation. ACM Transactions on Programming Languages and Systems 16, 3 (May), 428-455.

Chaitin, G. J., Auslander, M. A., Chandra, A. K., Cocke, J., Hopkins, M. E., and Markstein, P. W. 1981. Register allocation via coloring. Computer Languages 6, 47-57.

Hsu, W. C., Fischer, C. N., and Goodman, J. R. 1989. On the minimization of loads and stores in local register allocation. IEEE Transactions on Software Engineering 15, 10 (October), 1252-1260. ACM Transaction.

Poletto, M., Engler, D. R., and Kaashoek, M. F. 1997. tcc: A system for fast, flexible, and high level dynamic code generation. In Proceedings of the ACM SIGPLA N '97 Conference on Programming Language Design and Implementation. Las Vegas, NV, 109-121.

Drop an Octave: Reducing Spatial Redundancy in Convolutional Neural Networks with Octave Convolution.

Office Action in Taiwanese Appln. No. 110148167, mailed on Jun. 24, 2025, 30 pages (with Machine translation).

* cited by examiner

Deep Neural Network with multiple layers

FIG. 1C

Output of a node is input of next node
(Intermediate Feature Map)

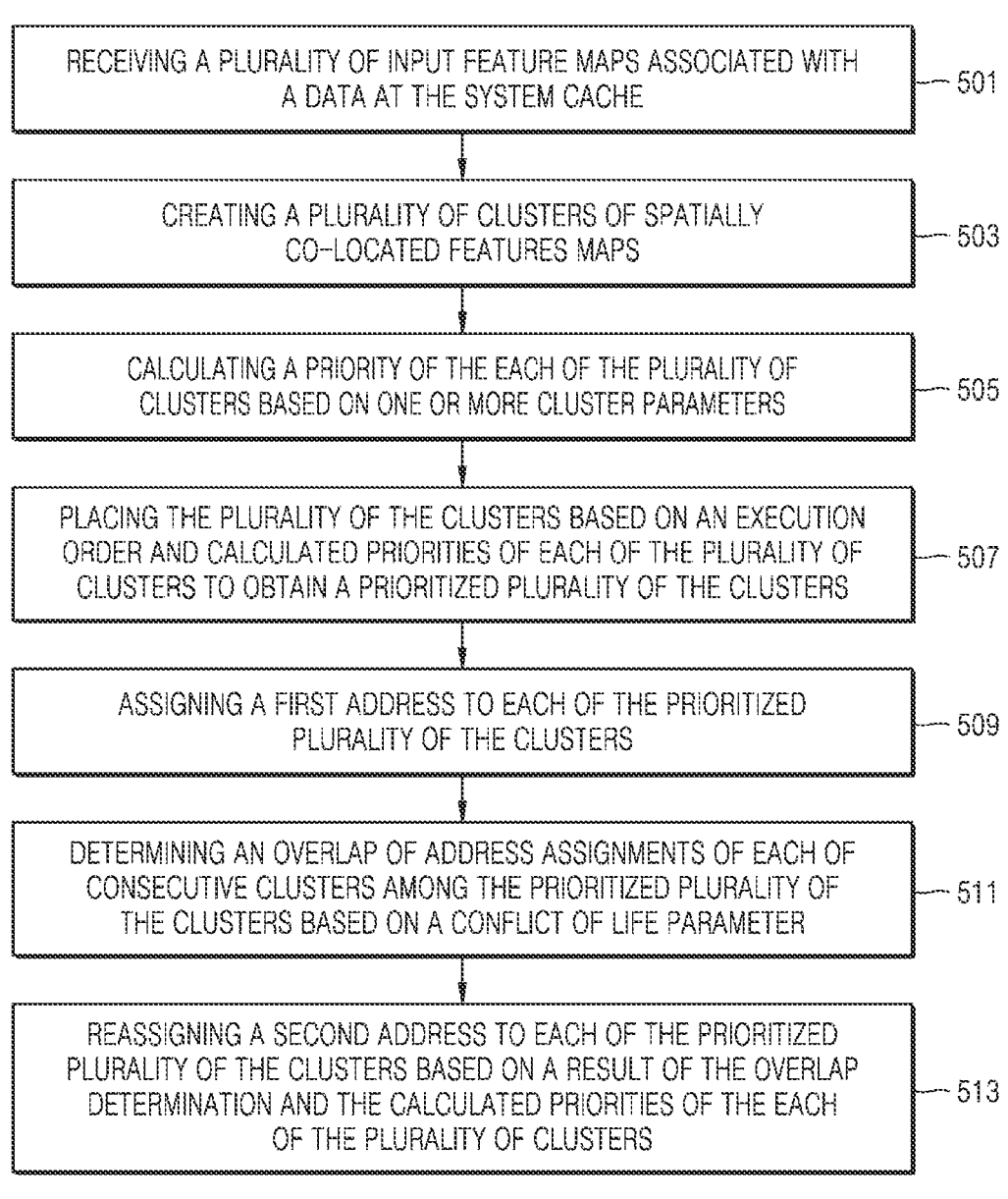

RECEIVING A PLURALITY OF INPUT FEATURE MAPS ASSOCIATED WITH A DATA AT THE SYSTEM CACHE — 501

CREATING A PLURALITY OF CLUSTERS OF SPATIALLY CO-LOCATED FEATURES MAPS — 503

CALCULATING A PRIORITY OF THE EACH OF THE PLURALITY OF CLUSTERS BASED ON ONE OR MORE CLUSTER PARAMETERS — 505

PLACING THE PLURALITY OF THE CLUSTERS BASED ON AN EXECUTION ORDER AND CALCULATED PRIORITIES OF EACH OF THE PLURALITY OF CLUSTERS TO OBTAIN A PRIORITIZED PLURALITY OF THE CLUSTERS — 507

ASSIGNING A FIRST ADDRESS TO EACH OF THE PRIORITIZED PLURALITY OF THE CLUSTERS — 509

DETERMINING AN OVERLAP OF ADDRESS ASSIGNMENTS OF EACH OF CONSECUTIVE CLUSTERS AMONG THE PRIORITIZED PLURALITY OF THE CLUSTERS BASED ON A CONFLICT OF LIFE PARAMETER — 511

REASSIGNING A SECOND ADDRESS TO EACH OF THE PRIORITIZED PLURALITY OF THE CLUSTERS BASED ON A RESULT OF THE OVERLAP DETERMINATION AND THE CALCULATED PRIORITIES OF THE EACH OF THE PLURALITY OF CLUSTERS — 513

—— MIF 0~3  —— NPUS 0~2  —— IRPS 0~3

Inference Time:
• IV3 408 FPS(without SLC) to 424 FPS (with SLC)
• DLV3 68 FPS(without SLC) to 75 FPS (with SLC)

FIG. 13

METHOD AND SYSTEM FOR FEATURE-MAPS ALLOCATION IN SYSTEM-CACHE USING PRIORITIZED LINEAR SCAN FOR NEURAL NETWORK ACCELERATION

CROSS-REFERENCE TO RELATED APPLICATIONS

A claim of priority is made to Indian Provisional Application No. 202041055826, filed Dec. 22, 2020, and to Indian Complete Application No. 202041055826, filed Dec. 16, 2021, the disclosures of which are incorporated herein by reference in their entireties.

BACKGROUND

The inventive concepts relates to a method and system for artificial intelligence (AI) acceleration for inference/training in system cache. More particularly, the inventive concepts relate to a neural network acceleration mechanism based on "Prioritized Linear Scan" for Neural Network Acceleration for allocation of the feature-maps in the system cache in a DRAM.

With recent advancements in machine learning (ML) technology, neural network architectures play a vital role related to the handling of complex data. Such architectures commonly employ a neural processing unit (NPU) as a specialized circuit that implements all necessary control and arithmetic logic operations to execute machine learning algorithms, typically by operating on predictive models such as artificial neural networks (ANNs) or random forests (RFs) and the like.

A state-of-the-art NPU hardware architecture is shown in FIG. 1A. Referring to FIG. 1A, the NPU hardware architecture 100A includes a Dynamic Random Access Memory (DRAM) 101, one or more a Direct Memory Access (DMA) circuits 103, a scratchpad Static Random Access Memory (SRAM) 105, an NPU Engine 109, and a Last Level Cache (LLC) 111. As shown, the DMA circuits 103 are coupled to and exchange data between the DRAM 101 and the scratchpad SRAM 105. In addition, the DMA circuits 103 are couple to and exchange data with the LLC 111.

The NPU engine 109 may be implemented with a neural network that usually includes an input layer, one or more hidden layers, and an output layer. An example of this is shown in FIG. 1B. In particular, FIG. 1B is a representation of a multiple-layer Deep Neural Network having an input layer, three hidden layers (1, 2, 3), with weighted links interposed between the outputs of one layer to the inputs of a next layer. The input layer is fed with an input feature map of data that needs to be processed, the hidden layers are fed with respective intermediate feature maps, and the output layer is fed with an output feature map. Microarchitectures have been developed to perform required high-end computations and to handle complex data.

A state-of-the-art microarchitecture 100B with an eDRAM based cache is shown in FIG. 1C. As shown, the microarchitecture 101B includes an eDRAM 150, and cache levels L1, L2 and L3. Here, the eDRAM 150 is treated like system memory. Each of first and second cores 151 and 152 include level 1 caches L1D, L1I, as well as level 2 caches L2. In addition, a graphics (GFX) unit 153 may be included having one or more graphics caches. The level three L3 cache is a Last/System Level Cache (LLC) 111 (2 MB/core). Also shown in FIG. 1C are a system agent 154, an eDRAM control (CTL) unit 155, an MSS tags unit 156, a memory controller (MC) 157, a Double Data Rate (DDR) memory 158, a data bus (PCIe) 159, and other devices 160.

The machine learning (ML) technologies make the design of the microarchitectures more complex. ML inference processing requires a huge amount of data to be accessed and processed. Thus, next-generation microarchitectures for ML not only need fast processors but also require faster memory access. As the next generation microarchitectures have faster processing speeds it usually makes use of multi-level cache memory to minimize the latency and buffer bandwidth between the fast processor(s) and the comparatively slow DRAM(s). Now in order to solve such memory challenges, Last/System Level Cache 111 or L3 caches of FIG. 1C are introduced.

FIG. 2 shows a state-of-the-art NPU DRAM PATH with Last/System Level Cache 111. In particular, FIG. 2 shows a plurality of AXI DMA processing units 161, 162 and 163, each including an Direct Memory Access unit 164, a scratch pad memory 165 and a compute engine 166, and each interfacing with a system bus 167. Also interfacing with the system bus 167 is the Last Level Cache (LLC) 111, and the LLC 111 interfaces with a plurality of MIF units 168, 169 and 170 (MIF 0, MIF 1 and MIF 2). A typical bandwidth (BW) requirement of various ports in the NPU DRAM path of a modern day System on Chip (SoC) is shown in FIG. 2 and in Table 1 below. As shown in Table, one DRAM (ideal) has much lower BW to offer to the NPU in comparison to the LLC (ideal).

TABLE 1

| Component | Typical BWs in an SoC (GB/s) |
|---|---|
| DMA AXI | 25 |
| Bus port | 100 |
| DRAM (ideal) | 50 |
| LLC (ideal) | 100 |

Referring to FIG. 3A, in a conventional implementation in neural network topology, an output of a node (Conv1, Conv2, Conv3) becomes an input to the next node which is termed as an intermediate feature map. Thus, according to FIG. 3A, too much data is going in the cache which evicts previous data. This is poorer than a non-cached feature map.

FIGS. 3B and 3C show the mapping of address ranges in the NPU sub-system. According to FIG. 3B, the system Memory Management Unit (MMU) addresses were mapped via an address mapper with the virtual address with intermediate feature map (IM), output feature map (OFM), and input feature map (IFM). Further, as highlighted in FIG. 3C the intermediate feature map area is divided into two parts i.e. an LLC disabled part and an LLC enabled part. However, the existing mechanism of enabling caching of intermediate feature buffers doesn't exhibit any major advantage in improving the performance, due to lack of locality and thrashing due to too much data movement in and out from the cache. Further, it was observed that caching degrades the performance of Neural Network Inference.

Further, in the case of neural networks algorithms, input feature maps (i.e. images) grow bigger and heavier, thus the memory footprint required becomes large. During runtime, several models run concurrently making the memory issue severe. Besides the memory availability bottleneck, several transactions from slow DRAM type memory impact the performance. Furthermore, for embedded systems, power consumption for neural networks is also a problem.

Thus, as may be seen, there exists a need to provide a methodology for the feature-map placement in DRAM to maximize Last/System Level Cache benefit for improvising performance, power, memory footprints, adaptivity.

SUMMARY

This summary is provided to introduce a selection of concepts in a simplified format that are further described in the detailed description of the invention. This summary is not intended to identify key or essential inventive concepts of the invention, nor is it intended for determining the scope of the invention.

In an implementation of the inventive concepts, a method for allocation of a feature-maps in a system cache in a dynamic random access memory (DRAM) is provided. The method includes receiving a plurality of input feature maps associated with a data at the system cache, creating a plurality of clusters of spatially co-located features maps, calculating a priority of the each of the plurality of clusters based on one or more cluster parameters, and placing the plurality of the clusters based on an execution order and calculated priorities of each of the plurality of clusters to obtain a prioritized plurality of the clusters. The method further includes assigning a first address to each of the prioritized plurality of the clusters, determining an overlap of address assignments of each of consecutive clusters among the prioritized plurality of the clusters based on a conflict of life parameter, and reassigning a second address to each of the prioritized plurality of the clusters based on a result of the overlap determination and the calculated priorities of the each of the plurality of clusters.

The method may further include determining a life of each of the plurality of clusters based on an execution order of each of the input feature maps, and determining the conflict of life parameter in the each of the assigned addresses of each of the prioritized plurality of the clusters based on the determined life of each of the plurality of clusters. The one or more cluster parameters may include at least one of a cluster size, a cluster access frequency, and cluster life.

The method may further include parsing the plurality of clusters, and sorting the plurality of clusters. The first address to each of the prioritized plurality of the clusters may be assigned to a lower order address near to a zero offset in the DRAM, and the plurality of the clusters other than the prioritized plurality of the clusters may be assigned to a higher order address in the DRAM.

After determining the conflict of life parameter, the method may include determining a priority of the prioritized plurality of the clusters, and, based on a result of the determination of the priority of the prioritized plurality of the clusters, the reassigning of the second address to each of the prioritized plurality of the clusters may include at least one of assigning a plurality of clusters having a highest priority to a lower order address near to a zero offset in the DRAM, assigning a plurality of clusters having a low priority to a higher order address in the DRAM, and assigning a plurality of clusters having mid priority to a middle order address in the DRAM.

In another implementation of the inventive concepts, a neural network (NN) system is provided for allocation of a feature map in a system cache of a DRAM, and the system cache communicatively coupled with the DRAM. The NN system includes at least one processor configured to receive a plurality of input feature maps associated with a data at the system cache, create a plurality of clusters of spatially co-located features maps, calculate a priority of the each of the plurality of clusters based on one or more cluster parameters, place the plurality of the clusters based on an execution order and calculated priorities of each of the plurality of clusters to obtain a prioritized plurality of the clusters, assign a first address to each of the prioritized plurality of the clusters, determine an overlap of address assignments of each of consecutive clusters among the prioritized plurality of the clusters based on a conflict of life parameter, and reassign a second address to each of the prioritized plurality of the clusters based on a result of the overlap determination and the calculated priorities of the each of the plurality of clusters.

The NN system may be further configured to determine a life of each of the plurality of clusters based on an execution order of each of the input feature maps, and determine the conflict of life parameter in the each of the assigned addresses of each of the prioritized plurality of the clusters based on the determined life of each of the plurality of clusters. The one or more cluster parameters may include at least one of a cluster size, a cluster access frequency, and cluster life.

The NN system may be further configured to parse the plurality of clusters, and sort the plurality of clusters. The first address to each of the prioritized plurality of the clusters may be assigned to a lower order address near to a zero offset in the DRAM, and the plurality of the clusters other than the prioritized plurality of the clusters may be assigned to a higher order address in the DRAM.

After determining the conflict of life parameter, the NN system may be further configured to determine a priority of the prioritized plurality of the clusters, and, based on a result of the determination of the priority of the prioritized plurality of the clusters, the reassigning of the second address to each of the prioritized plurality of the clusters may include at least one of assigning a plurality of clusters having a highest priority to a lower order address near to a zero offset in the DRAM, assigning a plurality of clusters having a low priority to a higher order address in the DRAM, and assigning a plurality of clusters having mid priority to a middle order address in the DRAM.

To further clarify the advantages and features of the present invention, a more particular description of the invention will be rendered by reference to specific embodiments thereof, which is illustrated in the appended drawing. It is appreciated that these drawings depict only typical embodiments of the invention and are therefore not to be considered limiting its scope. The invention will be described and explained with additional specificity and detail with the accompanying drawings.

BRIEF DESCRIPTION OF THE DRAWINGS

These and other features, aspects, and advantages of the inventive concepts will become better understood when the following detailed description is read with reference to the accompanying drawings in which like characters represent like parts throughout the drawings, wherein:

FIG. 1C illustrates a microarchitecture with Last/System Level Cache of the related art;

FIG. 5 illustrates a flow diagram for allocation of a feature map in a system cache of a DRAM, according to an embodiment of the inventive concepts;

FIG. 13 illustrates an exemplary scenario of cluster formation in a NPU core, according to an embodiment of the inventive concepts.

Figure 1A:
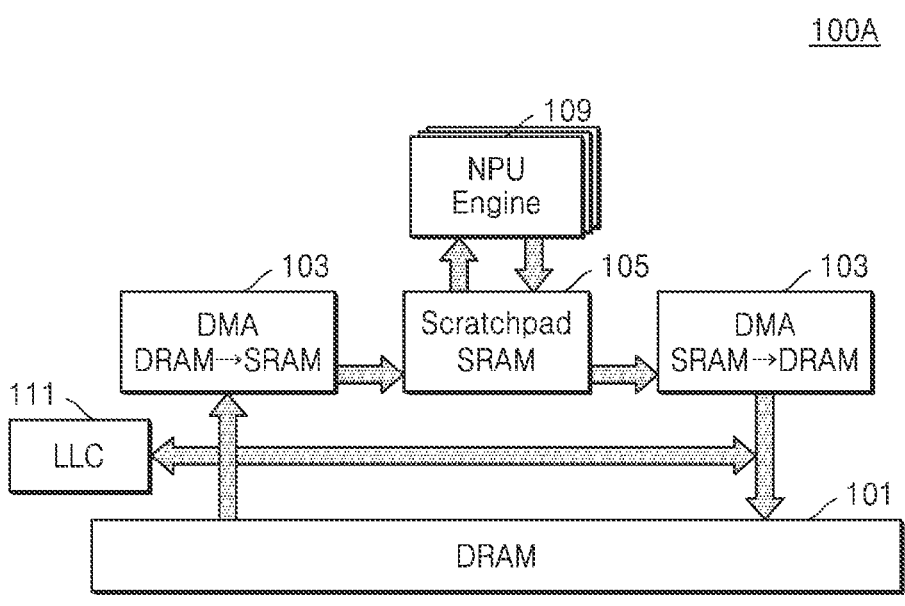
FIG. 1A illustrates an NPU hardware architecture of the related art.
Figure 1B:
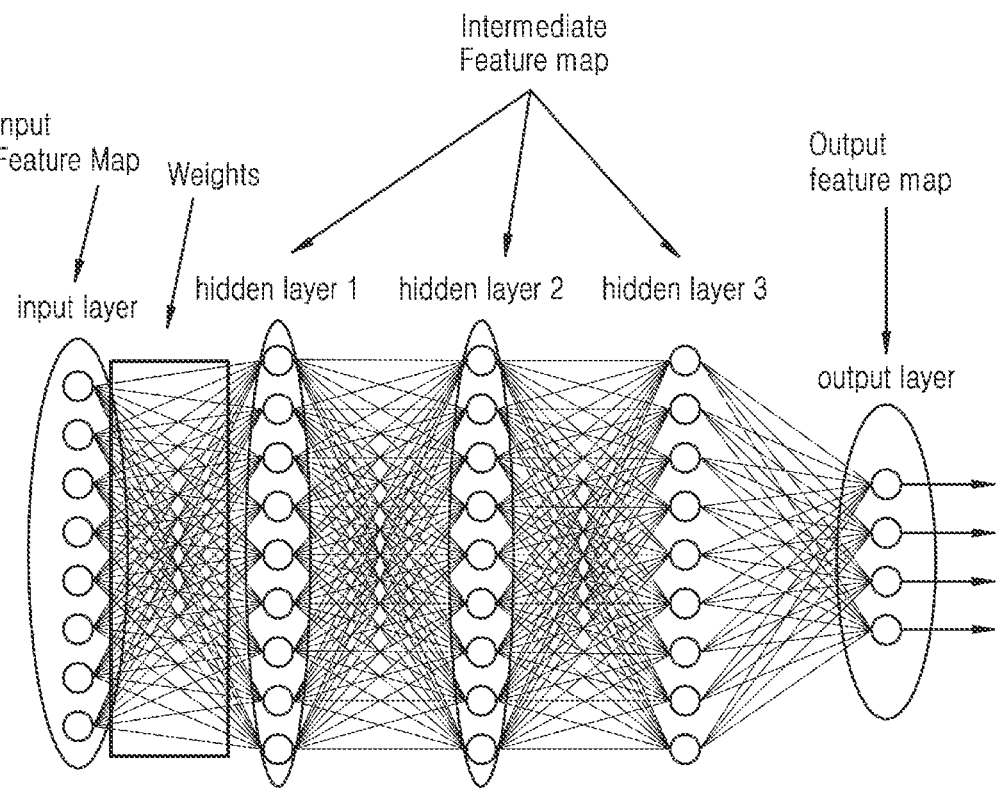
FIG. 1B illustrates a deep neural network of the related art.
Figure 2:
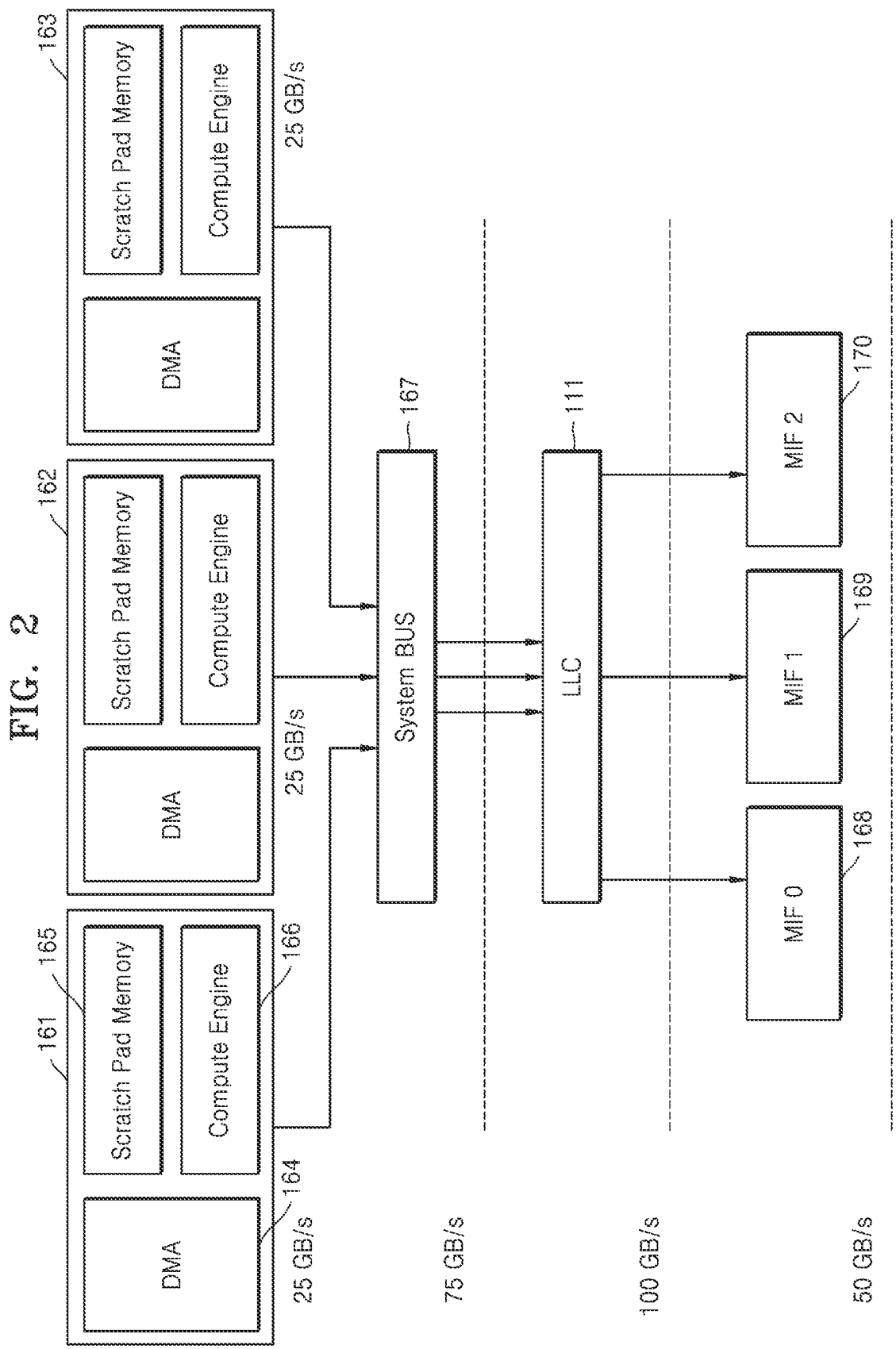
FIG. 2 illustrates NPU DRAM PATH with Last/System Level Cache of the related art.
Figure 3A:
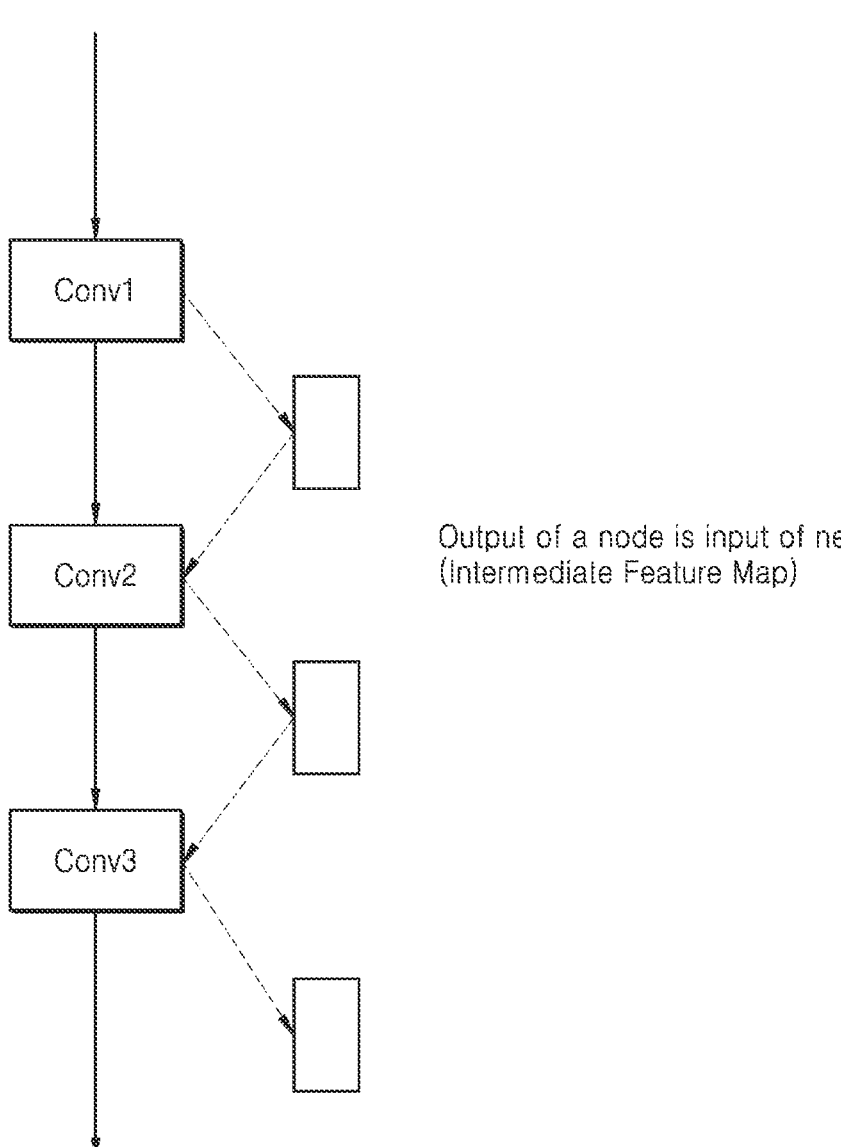
FIG. 3A illustrates an Intermediate Feature Map in a neural network topology of the related art.
Figure 3B:
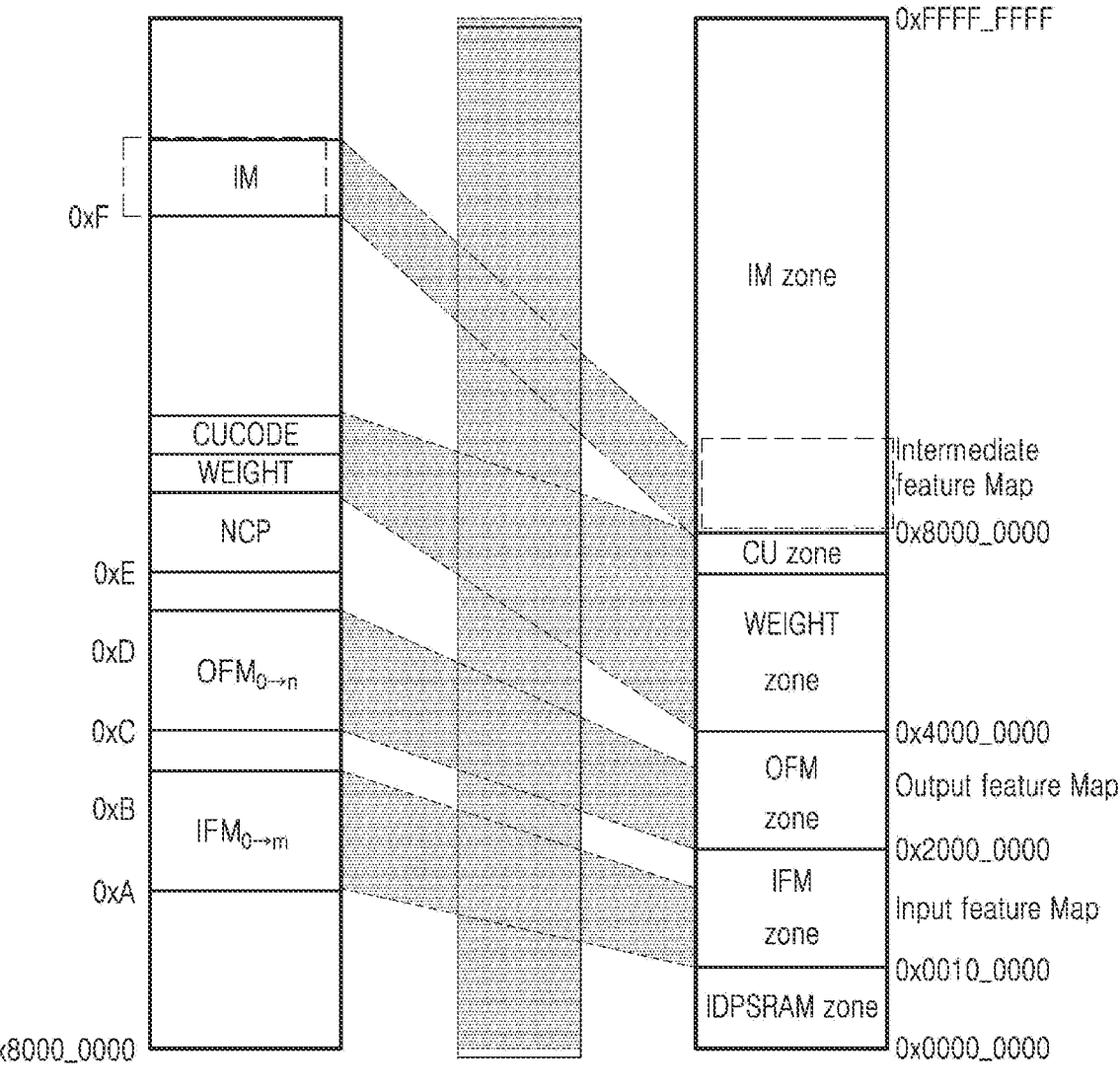
FIGS. 3B and 3C illustrate mapping of address ranges in an NPU sub-system of the related art.
Figure 3C:
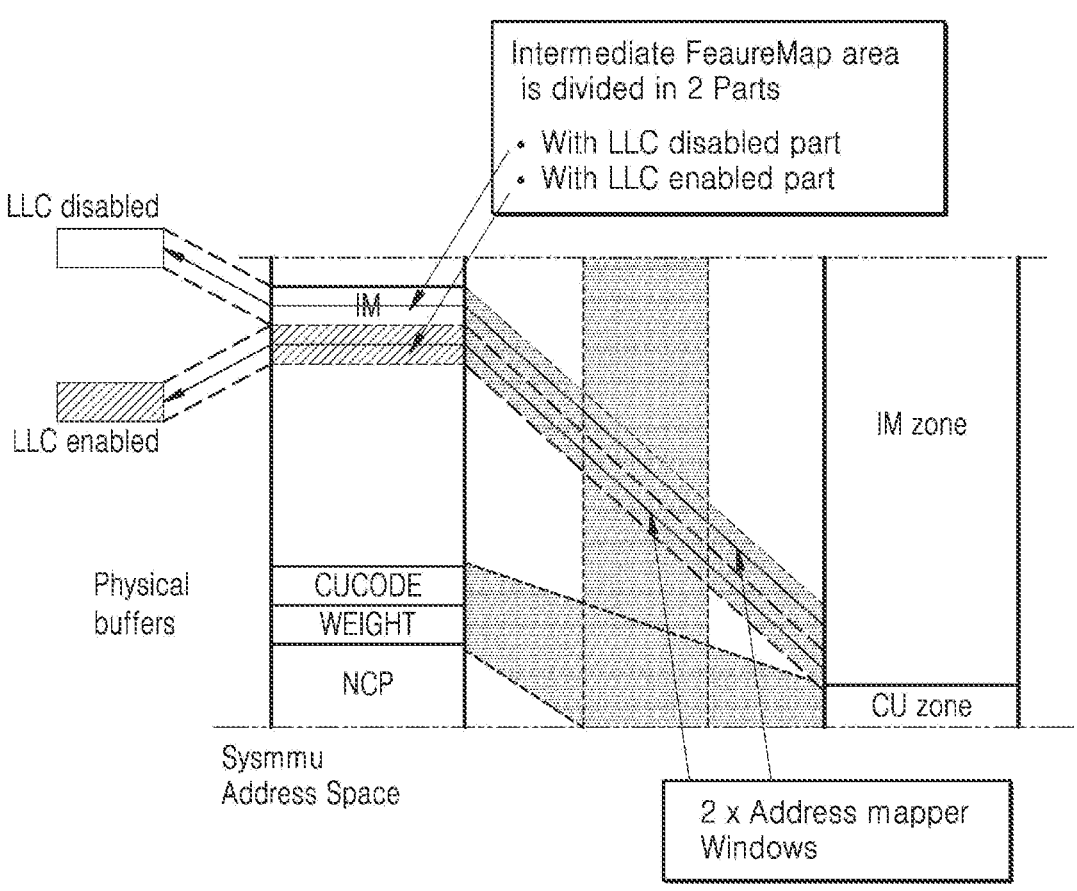

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having the benefit of the description herein.

DETAILED DESCRIPTION

It should be understood at the outset that although illustrative implementations of the embodiments of the inventive concepts are illustrated below, the present invention may be implemented using any number of techniques, whether currently known or in existence. The inventive concepts should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching, and illuminating some embodiments and their specific features and elements and does not limit, restrict, or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way, it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . ." or "one or more element is REQUIRED."

Unless otherwise defined, all terms, and especially any technical and/or scientific terms, used herein may be taken to have the same meaning as commonly understood by one having ordinary skill in the art.

Embodiments of the present invention will be described below in detail with reference to the accompanying drawings.

The present inventive concepts present a method and system relating to artificial intelligence (AI) acceleration, more specifically hardware acceleration, for inference/training in the system cache. More particularly, the present inventive concepts relate to a neural network acceleration mechanism based on "Prioritized Linear Scan" (PLS) technique for Feature-Maps (FM) Allocation in a System-Cache. As an example, the feature-map may be an intermediate feature-map (IFM). The implementation of the "Prioritized Linear Scan" (PLS) for Feature-Maps Allocation in the System-Cache will be explained in the forthcoming paragraph.

Figure 1C:
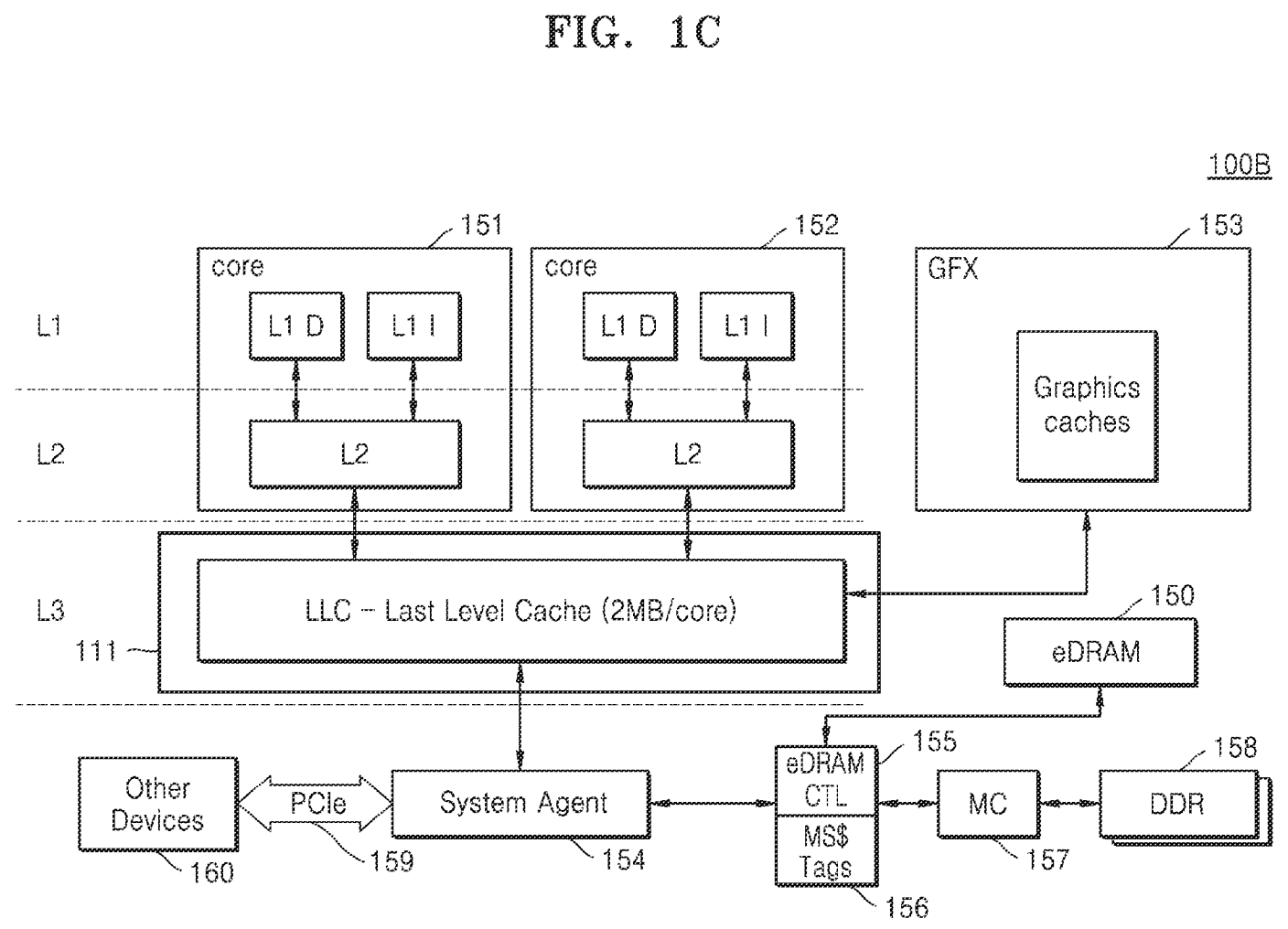
Figure 4:
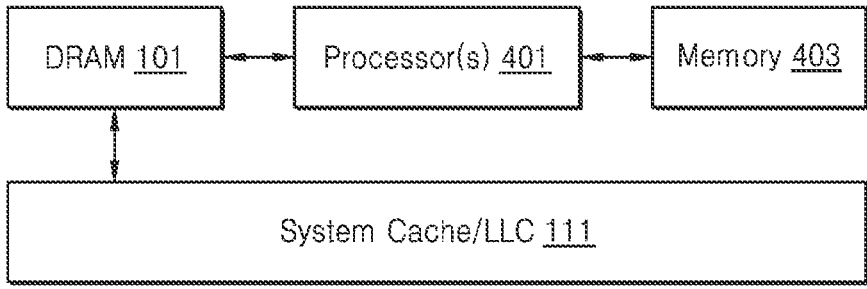
FIG. 4 illustrates a Neural Network (NN) system architecture for allocation of a feature map in a system cache of a DRAM, in accordance with an embodiment of the inventive concepts.

FIG. 4 illustrates a Neural Network (NN) system architecture for allocation of a feature map in a system cache of a DRAM, in accordance with an embodiment of the inventive concepts. As shown in FIG. 4, a NN system 400 for allocation of a feature map in a system cache of the DRAM, includes a DRAM 101, a system cache/LLC 111, at least one processor 401, and memory 403 coupled with each other. The NN system 400 may be implemented in the system corresponding to systems 100A and 110C as shown in FIG. 1A and FIG. 1C respectively. As an example, the NN system may be referred to as an NN node without deviating from the scope of the disclosure. Further, the reference numerals are kept the same as applicable for ease of explanation.

In an example, the processor 401 may be a single processing unit or a number of processing units, all of which could include multiple computing units. The processor 401 may be implemented as one or more microprocessors, microcomputers, microcontrollers, digital signal processors, central processing units, logical processors, virtual processors, state machines, logic circuitries, and/or any devices that manipulate signals based on operational instructions.

Among other capabilities, the processor 401 is configured to fetch and execute computer-readable instructions and data stored in the memory 403.

The memory 403 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

In an example, the module(s), engine(s), and/or unit(s) may include a program, a subroutine, a portion of a program, a software component or a hardware component capable of performing a stated task or function. As used herein, the module(s), engine(s), and/or unit(s) may be implemented on a hardware component such as a server independently of other modules, or a module can exist with other modules on the same server, or within the same program. The module (s), engine(s), and/or unit(s) may be implemented on a hardware component such as processor one or more microprocessors, microcomputers, microcontrollers, digital signal processors, central processing units, state machines, logic circuitries, and/or any devices that manipulate signals based on operational instructions. The module (s), engine(s), and/or unit(s) when executed by the processor(s) may be configured to perform any of the described functionalities.

FIG. 5 is a flow diagram for allocation of a feature map in a system cache of a DRAM, according to an embodiment of the inventive concepts. Method 500 may be implemented in the system 400 as shown in the FIG. 4. According to an alternate embodiment the method 500 may be implemented in the system 100A and 100B of FIGS. 1A and 1C. According to the embodiment of the inventive concepts, the method 500 is a unique technique for Feature-Map (FM) placement in DRAM to maximize LLC/system cache 111 benefits. The method 500 may be referred to as a Prioritized Linear Scan (PLS) technique 500 throughout the disclosure without deviating from the scope of the disclosure.

According to an embodiment of the inventive concepts, initially a Feature-Map blob clusters creation is performed and then priority or rank of the cluster is being estimated. According to an embodiment of the inventive concepts, the PLS technique 500 may include a pre-cursor step as follows:

a) Performing a clustering of spatially co-located blobs.

b) calculating a liveliness of the clusters from an execution order.

c) calculating of priority of each clusters.

After performing the pre-cursor step, the PLS technique 500 performs a first iteration and a second iteration for placing the cluster and fixing any overlaps between consecutive cluster to avoid data corruptions. A detailed explanation of the above will be explained in the forthcoming paragraphs.

As shown in the FIG. 5, initially at step 501, the method 500 includes receiving one or more input features maps (FM) associated with a data at the system cache. As an example, the feature maps (FM) may be any data that may be received at the system cache 111.

At the step 503, the processor 401 may be configured to creates one or more clusters of spatially co-located features maps. According to an embodiment a cluster may be created by grouping particular FMs which together can reduce the FM load time for a given a neural network (NN) Node. Further, clustering is when an NN node depends on multiple intermediate Feature Maps (IFMs) or IFM tiles when generated by multiple execution paths, and then loading all of them from LLC yields better performance. Due to the aforesaid reasons, the clustering is performed. As an example, each cluster has at least one FM.

Figure 6A:
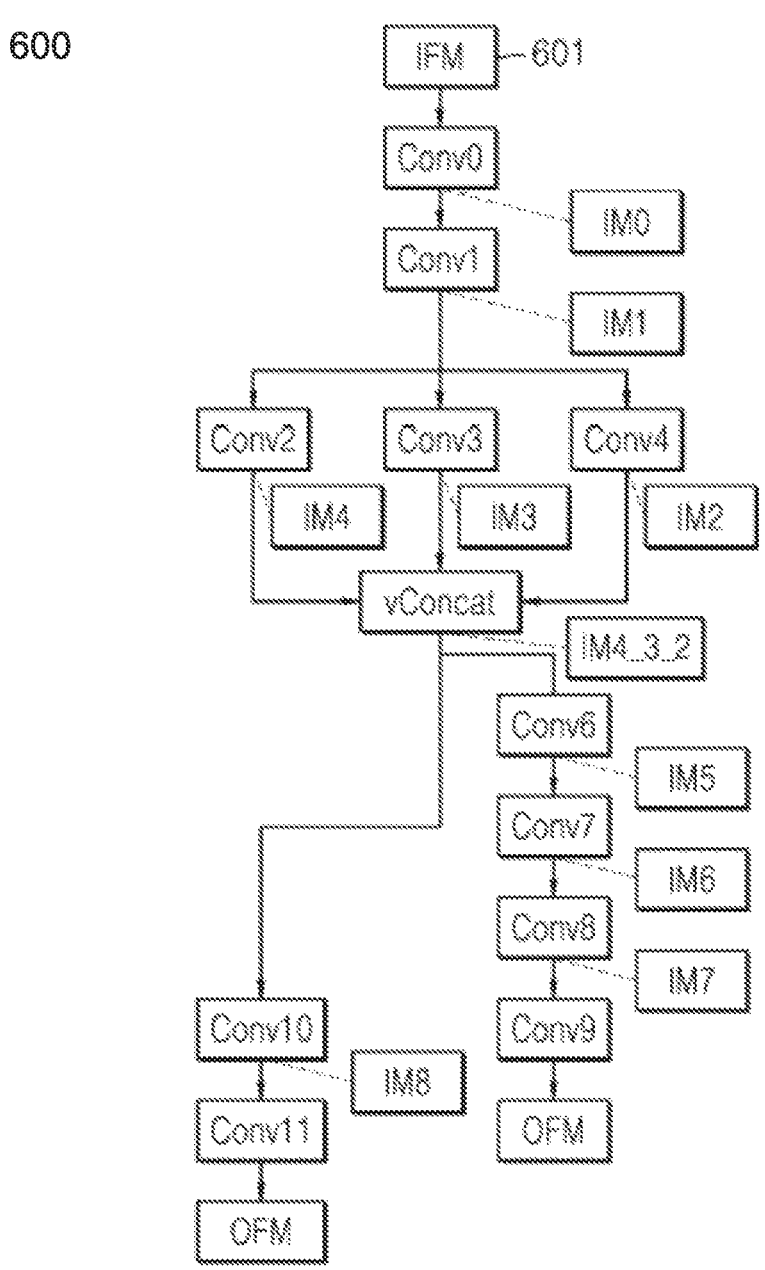
FIGS. 6A, 6B and 6C illustrate a clustering technique in a pre-cursor step, according to an embodiment of the inventive concepts.
Figure 6B:
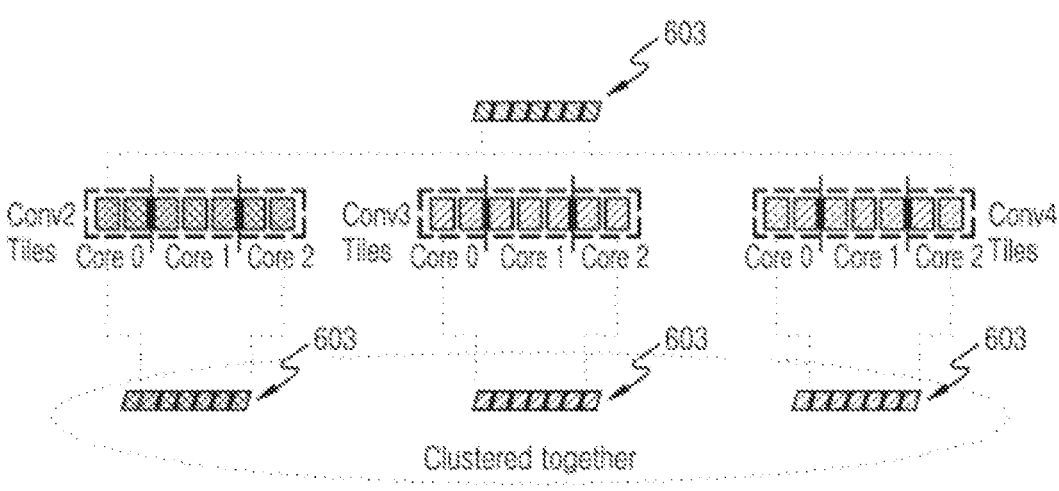
Figure 6C:
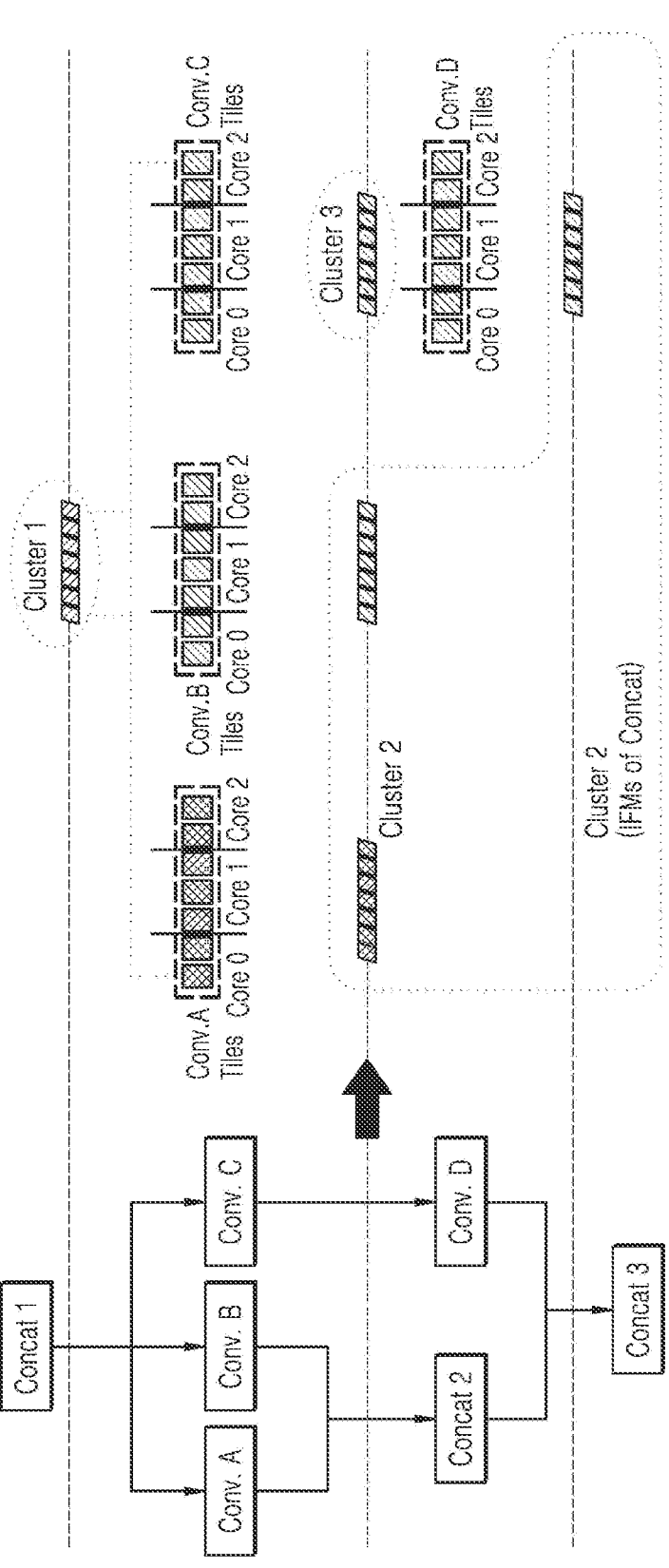

FIGS. 6A, 6B and 6C illustrate a clustering technique in a pre-cursor step, according to an embodiment of the inventive concepts. FIG. 6A shows a method 600 for creating blob cluster. As an example, the clustering of the FM may be associated with segmentation of Blobs or segmentation of feature map data into Blob or obtaining a feature map cluster.

Accordingly, the method of creating blob cluster is related to each other with a relation governed by Neural Network topology, execution schedule, optimization method etc, and can be relocated as a whole without changing relative position. For example, Input feature maps (IFMs) of Concat layers, feature maps (FM) which can be loaded together to Scratch pad memory with fused DMA operation, feature maps grouped together to improve compression efficiency etc.

According to an embodiment, as shown in the FIGS. 6a and 6b, in order to obtain which FM is to cluster, the IFM features 601 of a concat is being followed by one or more convolutions. According to the further embodiment, IFMs of an element-wise operation layer is being performed as explained above and then Output Feature Maps (OFM) are generated from a synchronization point in multi-threaded execution. A detailed explanation of the same will be explained in the forthcoming paragraphs.

For example, conv0 and conv1 is performed on the IFM 601 to obtain Intermediate Feature IM0 and IM1 respectively. As an example, from the concat 1, cluster 1 may be obtained as shown in FIG. 6b. Accordingly, after performing Conv. 1, Conv. 2, and/or Conv. 3, one or more respective clusters 603 are obtained as shown in the FIGS. 6a and 6b.

In particular, as shown in FIG. 6A IM2, IM3 and IM4 are the input feature map of common Concat layer which generates IM4_3_2 after concatenation. According to the embodiment, the most common optimized implementation and zero cost solution for concat layer is to write the output feature map (OFM) of the layer previous to concat, to the output feature map of the concat. Due to this IM2, IM3, IM4 share a spatial locality relation as they are part of IM4_3_2. Thus, the proposed approach binds IM2, IM3, IM4 in a single cluster and are treated as unified feature map in PLS algorithm. All feature Maps which shares spatial locality relation and have overlapping or adjacent lives, may be a part of a cluster.

According to an embodiment, considering G to be a Neural Network Directed Acyclic Graph having set of Vertices (V) and set of Edges (E), Feature Maps (F) having Data Blobs (B). Accordingly, mathematically, the Cluster (C) may be defined as a group of Feature Maps which shares common characteristics or relation (*) amongst each other, for DRAM Compaction, relation (*) has been the same DRAM addresses the blob share as given in the equation 1 below.

$$C = \{\text{UNION of } B_i \text{ along } i \text{ such that } B_i \text{ share same } (*)\}, \tag{1}$$

$$\text{that is to say } C = \{ \text{ of } B_i \text{ along } i \text{ such that } B_i \text{ share same } (*)\}$$

$$\text{where } i = 1, 2, 3$$

According to an embodiment, after clustering, a life of the cluster is being calculated. Now in an execution sequence/order, life started is a point when FM is generated, and a life end is the point when it was last read by any node. Thus, in an embodiment, the processor 401 may be configured to determine a life of each of the plurality of clusters based on an execution order of each of the input feature maps. Accordingly, mathematically, execution Schedule (S) may be defined as execution sequence/order of Neural Network on the heterogeneous platform given in the equation 2 below.

$$S = U_i \varepsilon_i, \ i = 1, 2, 3 \qquad (2)$$

where, $\varepsilon_i$ = One unit of Neural network Operation

According to an embodiment, the Blob Life ($\beta_i$) may be defined as a first and last Access point of a Feature map and given in equation 3 below.

$$B_l = \{a_l^{start}, a_l^{end}\} \qquad (3)$$

where $a_l$ = access point of the feature map

According to a further embodiment, the Cluster Life ($C_l$) may be mathematically defined in equation 4 below.

$$C_l = \{\min(a_{i_l}^{start}), \max(a_{i_l}^{end})\}, \ i = U_i B_i \qquad (4)$$

As an example, referring to the FIG. 6A, a calculation of the life of the cluster is shown in the Table 2 and Table 3.

TABLE 2

| Execution schedule: |
| --- |
| Conv0 –> Conv1 –> Conv4 –> Conv3 –> Conv2 –> Concat –> Conv6 –> Conv7 –> Conv8 –> Conv9 –> Conv10 –> Conv11 |

TABLE 3

| Life of few Feature Maps: |
| --- |
| Life of IM0: Conv0 –> Conv1 |
| Life of IM1: Conv1 –> Conv4 –> Conv3 –> Conv2 |
| Life of IM4_3_2: Conv4 –> Conv3 –> Conv2 –> Concat –> Conv6 –> Conv7 –> Conv8 –> Conv9 –> Conv10 –> Conv11 |

According to an embodiment, in a neural network, a layer can be processed/executed only when its input feature map is ready after processing of previous layer. Further, one or more parallel paths in a neural network may be executed in any order. Considering the aforesaid requirements, there may be many possible execution schedules for a neural network and one such schedule is used as depicted in the Table 2 for illustration purpose. Accordingly, Conv1 may be processed only when its input feature map is ready after the processing of the Conv0.

Further, according to the Table 3, when a layer is getting processed, it needs its all input and output feature maps available for reading and writing. In other words, input and output feature maps must be alive for a layer to get processed. Since IM0 is output of Conv0 and input of Conv1; its life starts at Conv0 and ends at Conv1. Thus, Table 3 depicts the life of the intermediate feature map.

Now, after performing the step 503, the processor 401 at step 505 may be configured to calculate a priority of the each of the cluster based on one or more cluster parameters. As an example, the one or more cluster parameters comprising at least one of a size of cluster, an access frequency of the cluster, the life of the cluster. The access frequency of the cluster may alternately be referred as the read count of the cluster. This can be achieved based on following equation 5:

$$Pi = W_0 * (X_0)^{y0} + W_1 * (X_1)^{y1} + W_2 * (X_2)^{y2} \qquad (5)$$

where, $W_{0,1,2}, Y_{0,1,2}$ = heuristically parameters;

$X_0$ = Read count of clusters $X_1$ = Life of clusters $X_2$ = Size of clusters According to an embodiment, the Cluster Priority ($C_p$) may be defined as a priority of a cluster based on parameters $\mu$. Mathematically the Cluster Priority ($C_p$) may be defined in equation 6 below.

$$C_p = f(\mu_1, \mu_2, \mu_3, \dots) \qquad (6)$$

According to an embodiment the clusters priority can be based on, but not limited to, several parameters $\mu$ like 1) the life of a cluster, 2) the number of times it is read from memory during the execution of Neural Network (NN) 3) the size of a cluster 4) a compression ratio of cluster etc.

According to a further embodiment, the priorities are heuristically calculated to ensure that highly ranked clusters remain in lower positions of DRAM, hence less Lookup in DRAM, more lookup in cache thereby providing minimum DRAM traffic between DRAM and Neural accelerator. As an example, referring to FIGS. 6A and 6B, a calculation of the priority of each cluster is shown in the Table 4.

TABLE 4

| Read count of IM1: 3 (Conv4, Conv3, Conv2) Read count of IM4_3_2: 2 (Conv6, Conv10) |
| --- |

As shown in FIGS. 6A and 6B, IM1 feature map is input to layers Conv2, Conv3 and Conv4. During the execution of each of these layers, IM1 will be read, hence read count of IM1 is 3 as depicted in the Table 4.

Figure 7:
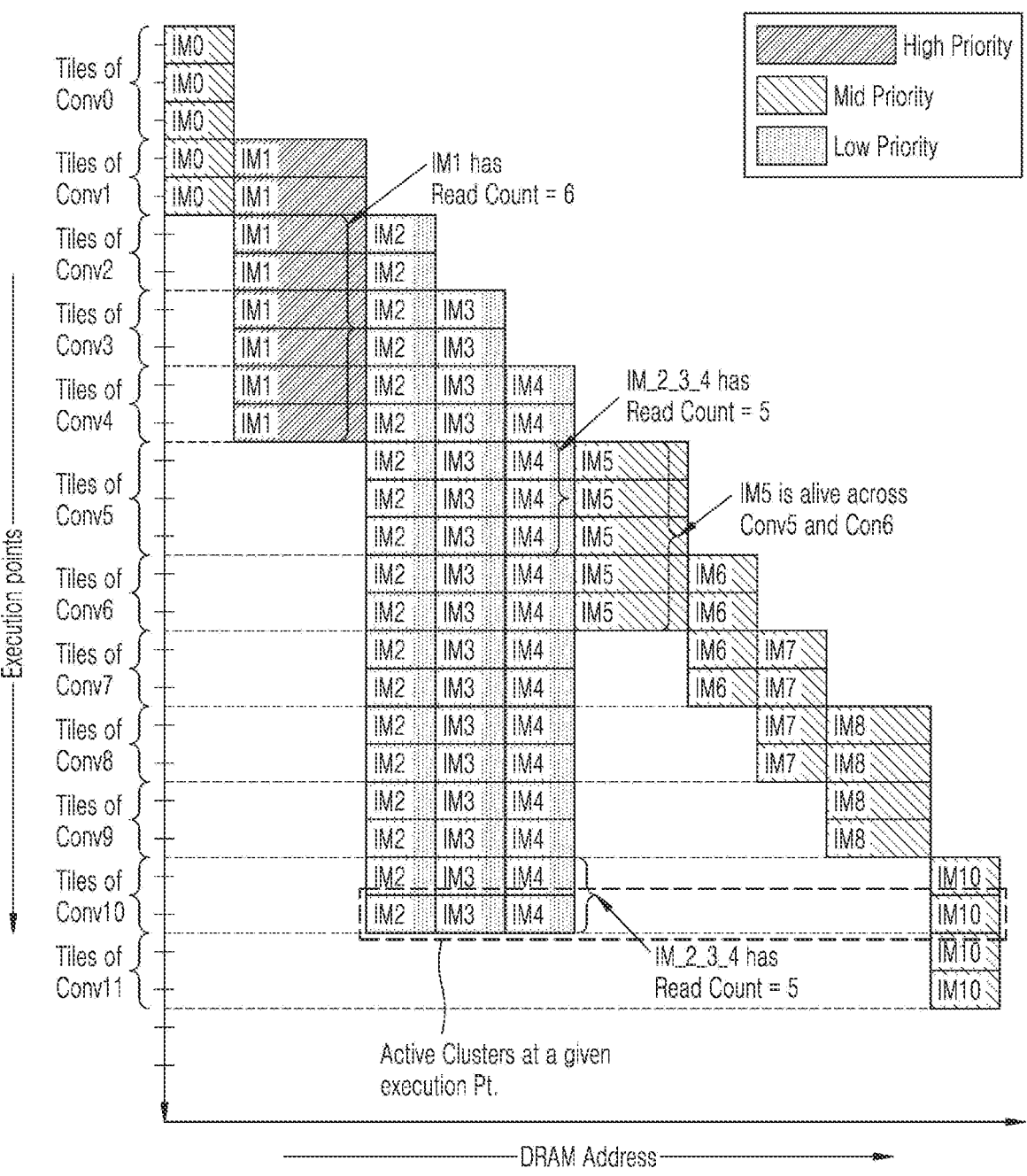
FIG. 7 illustrates a sample NN and baseline approach for FM allocation, according to an embodiment of the inventive concepts.
Figure 8:
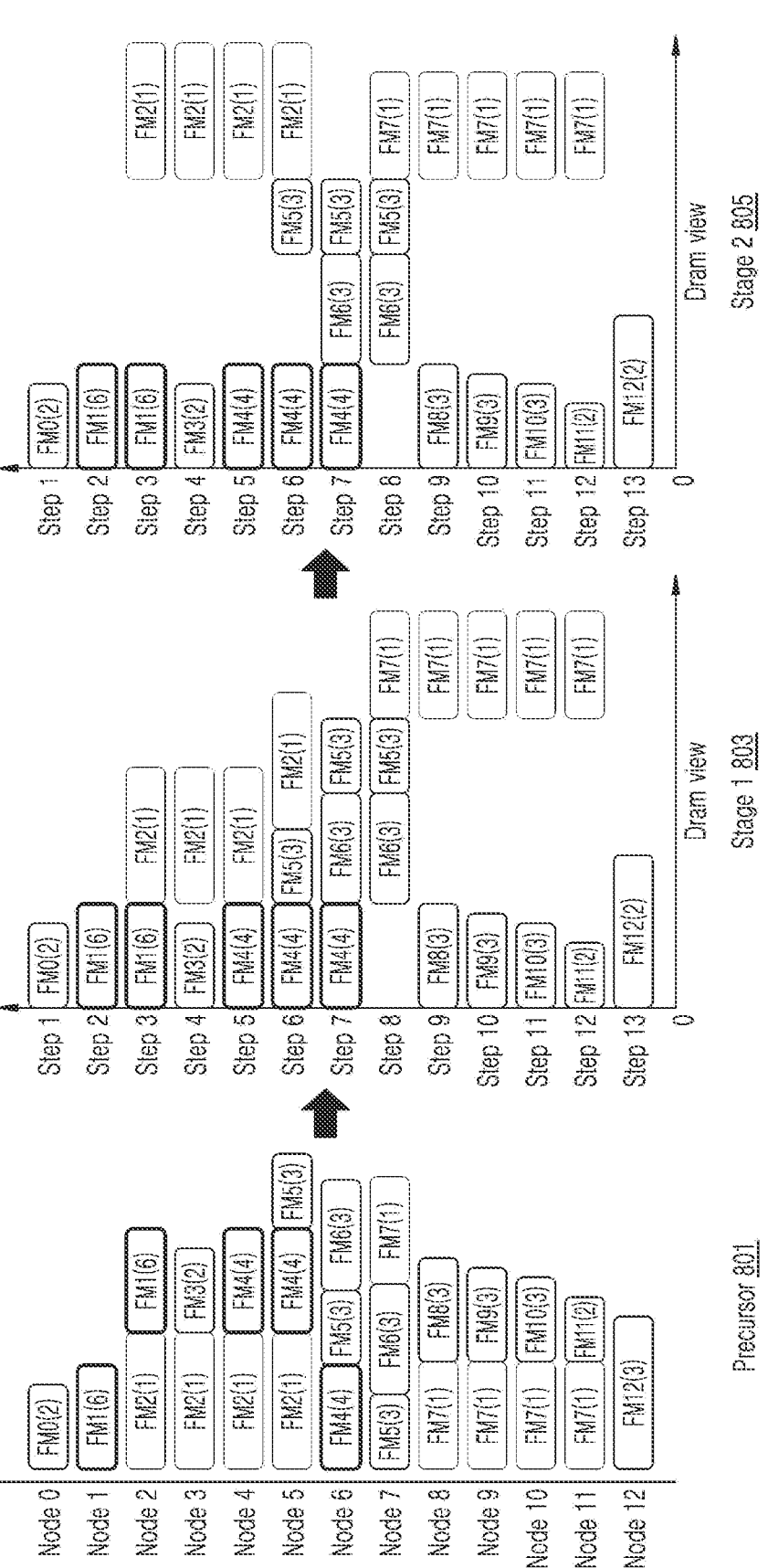
FIG. 8 illustrates an example of a Prioritized Linear Scan (PLS) mechanism, according to an embodiment of the inventive concepts.

Thus, according to the pre-cursor step an FM cluster is being created, and then after calculating the priority a list of alive-clusters against each execution step in the execution schedule. FIG. 7 illustrates a sample NN and baseline approach for FM allocation, according to an embodiment of the inventive concepts. As shown in the FIG. 7, a highest priority FM 701 are allocated in the lower position of the DRAM followed by a mid-priority FM 703, and then lower priority cluster 705 are placed. FIG. 8 illustrates an example of a Prioritized Linear Scan (PLS) mechanism, according to an embodiment of the present subject matter. FIG. 8 illustrates the precursor stage 801 (Stage 1).

According to the further embodiment, the PLS method 500 further includes allocation of feature map blob clusters in cacheable DRAM area to maximize SLC hit ratio with least possible eviction of data from SLC to DRAM. The method performs a local minimization in first stage of iteration of address allocation using the greedy approach and iteratively achieves global minimization in 2nd stage of iteration. The PLS algorithm offers a robust mathematical framework that enables generalization in different scenarios and overcomes a constrained optimization problem. The implementation of the first stage of iteration and the second stage of iteration will be explained in detail below.

Continuing with method 500 as shown in the FIG. 5, at step 507, the processor 401 may be configured to place the plurality of the cluster based on the execution order and the calculated priorities of each of the cluster to get a prioritized plurality of the clusters. Thereafter, at step 509, the processor 401 may be configured to assign the first address to each of the prioritized plurality of the clusters. The step 507 and 509 together form a first stage of iteration.

According to an embodiment, FIG. 8 at 803 (Stage 2) illustrates an example of the implementation of the first iteration. The first iteration may include following detailed steps.

Parse from last execution step

Rearrange clusters based on priority

According to an embodiment, for performing the first stage of iteration, the processor 401 may be configured to parse the plurality of clusters and then sorting the plurality of clusters to place the plurality of the clusters. The first address to each of the prioritized plurality of the clusters is assigned to a lower order address near to zero offset in the DRAM and the plurality of the clusters other than the prioritized plurality of the clusters are assigned to a higher order address in the DRAM. Table 5 illustrates the first stage of iteration. According to an embodiment, Feature Map clusters are defined by life (L1, L2, . . . Ln), Size (S1, S2, . . . Sn) and Priority (P1, P2, . . . Pn). Schedule is defined as a series of Execution points (E1, E2, . . . Em); Active Cluster list for each execution point (A1, A2, . . . Am); Allocated Address for cluster (Ad1, Ad2, . . . And.

TABLE 5

First Iteration; Input: L, S, P, E; Output: A', $Ad_n$
For e = 1 to m //parse execution points
For c = 1 to n //parse all clusters
If e ∈ $L_c$ (life of Cluster c)
Add c to $A_e$
Sort Clusters based priority, decreasing order, $A'_e$
For c = 1 to Size($A'_e$) //parse clusters in sorted $A'_e$
If Address not allocation for c

12

TABLE 5-continued

Insert immediately after c-1 in DRAM
Push others towards higher address in DRAM

Figure 9:
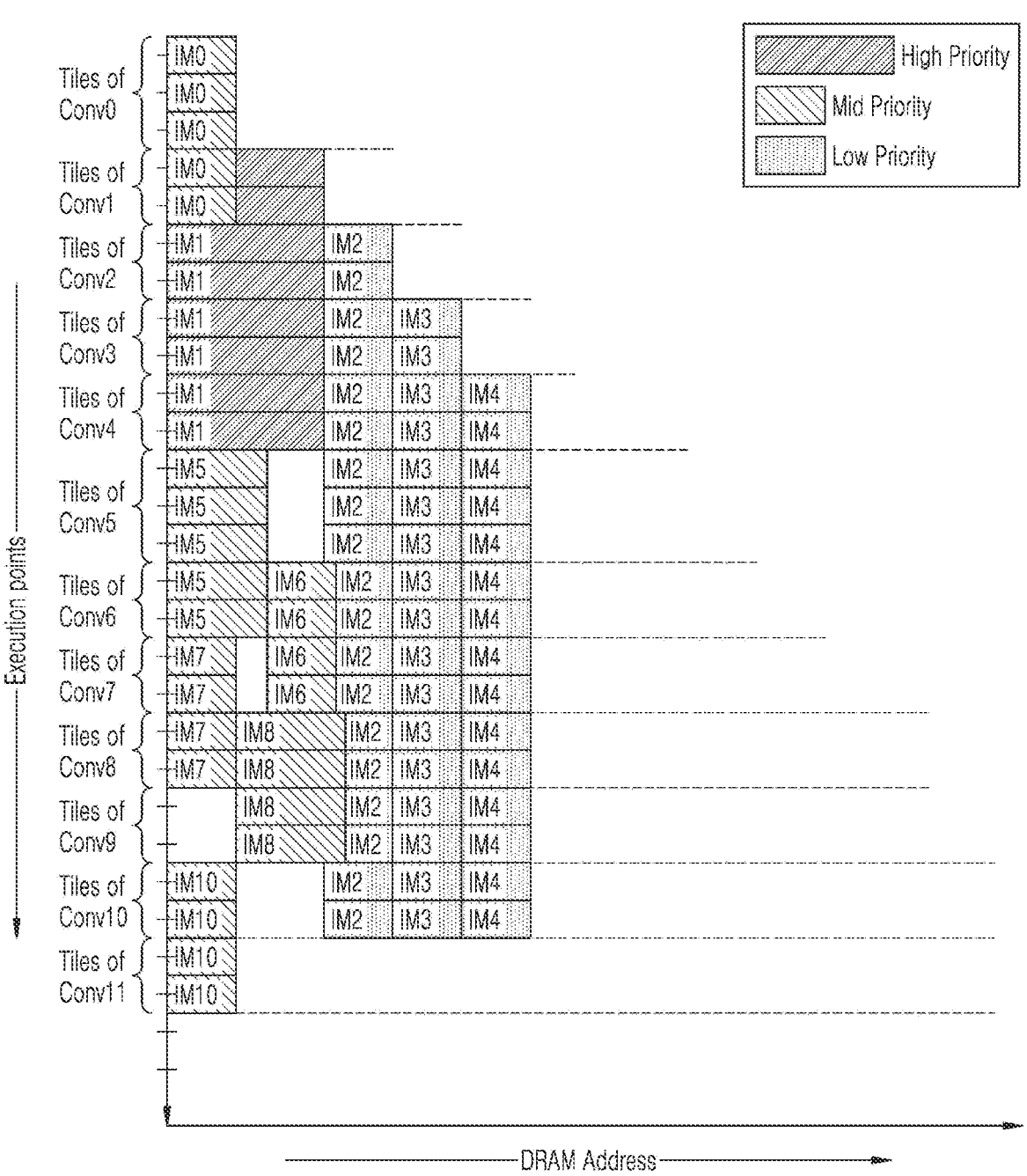
FIG. 9 illustrates an example of first iteration, according to an embodiment of the inventive concepts.

FIG. 9 illustrates an example of first iteration, according to an embodiment of the inventive concepts. Thus, in the first iteration, every time a new Cluster comes into existence, position it as per the priority, even if its conflicts with other. Thus, the end results is that all high priority clusters are placed at right location. Thus, few low priority cluster are conflicting with high priority clusters.

Continuing with the method 500 as shown in the FIG. 5, at step 511, the processor 401 may be configured to determine an overlap of assignment of addresses to each of a consecutive clusters of the prioritized plurality of the clusters based on a conflict of life parameter. Then at step 513 the processor 401 may be configured to reassign a second address to each of the prioritized plurality of the clusters based on a result of determination and the calculated priorities of the each of the cluster. The step 511 and 513 together forms a second stage of iteration.

According to an embodiment, FIG. 8 at 805 (Stage 3) illustrates an example of the implementation of second iteration. The second iteration may include following detailed steps.

Iteratively resolve liveness conflicts but moving low-priority clusters to higher DRAM Addresses.

According to an embodiment, for performing the second stage of iteration, the processor 401 may be configured to determine the conflict of life parameter in the each of the assigned address of each of the prioritized plurality of the clusters based on the determined life of each of the plurality of clusters. Further, after determining the conflict of life parameter, the processor 401 may be configured to determine a priority of the prioritized plurality of the clusters. Then, based on a result of the determination of the priority of the prioritized plurality of the clusters, the reassigning of the second address to each of the prioritized plurality of the clusters of step 513 includes at least one of:

assigning a plurality of clusters having highest priority to a lower order address near to zero offset in the DRAM, assigning a plurality of clusters having low priority to a higher order address in the DRAM; and assigning a plurality of clusters having mid priority to a middle order address in the DRAM. Table 6 illustrates the second stage of iteration. According to an embodiment, Feature Map clusters are defined by life (L1, L2, . . . Ln), Size (S1, S2, . . . Sn) and Priority (P1, P2, . . . Pn). Schedule is defined as series of Execution points (E1, E2, . . . Em); Active Cluster list for each execution point (A1, A2, . . . Am); Allocated Address for cluster (Ad1, Ad2, . . . And.

TABLE 6

Second Iteration Input: A', Ad, L, E; Output: Ad
AllocationConverged=0
While AllocationConverged==0: // Cycles
AllocationConverged=1
For e = 1 to Size(A') //parse Active cluster list for schedule
For c = 2 to Size(A'[e]) // active clusters for Exec. pt e
If Ad[c] overlaps with Ad[c-1]:
Push c to End address of c-1, update
AllocationConverged = 0
Time Complexity: O(m*n) [Applied trivial optimizations]
Space Complexity: O(m*n)

Figure 10:
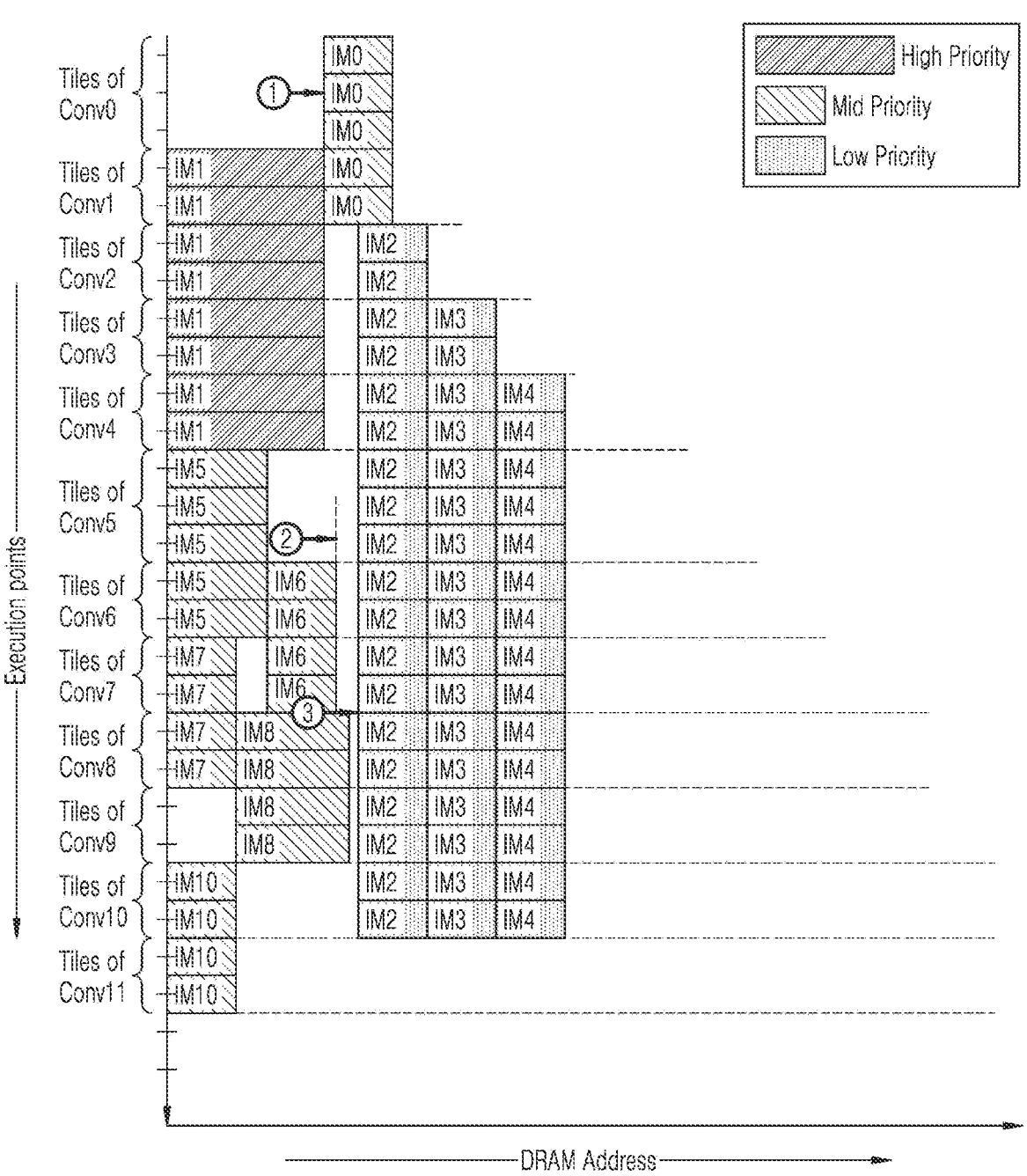
FIG. 10 illustrates an example of second iteration, according to an embodiment of the inventive concepts.

FIG. 10 illustrates an example of second iteration, according to an embodiment of the inventive concepts. Thus, in the second iteration, in Cycle1:

at Step1: Move IM0 after IM1
Step2: Move IM2_3_4 after IM6
Step3: Move IM2_3_4 after IM8

In Cycle 2: No change, Solution converged. Thus, a complicated graph can have N cycles in worst case. Accordingly, a structure of the PLS algorithm may include a set up phase as explained in FIGS. 6A, 6B and 6C. Then, first iteration phase that includes placing of all the clusters according to their execution order and priorities, assigning their addresses. Second iteration phase that includes fixing the overlaps between consecutive clusters, address obtained by first iteration, to avoid data corruption.

According to an embodiment of the inventive concepts, a Cluster Final Position ($P_{start:end}$) may be given by the equation 7. Thus, this is final Cluster's address in the memory.

$$p_{start:end} = f(C_l, C_p) \tag{7}$$

According to a further embodiment of the inventive concepts, the PLS Formal Setup may be given by the equation 8:

$$\max_p(G(p_{start:end}) - \lambda * L(p_{start:end})) \tag{8}$$

Figure 11:
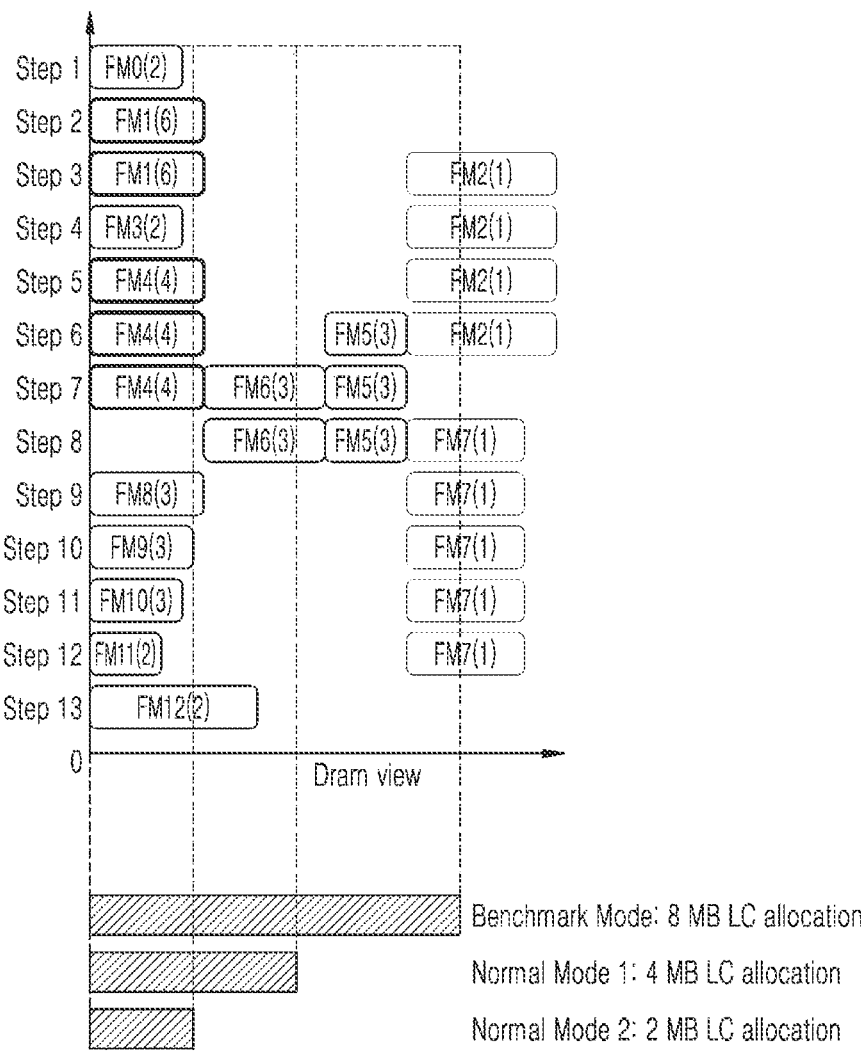
FIG. 11 illustrates Last/System Level Cache mapping a DRAM addresses for Caching, according to an embodiment of the inventive concepts.

G: Gain of Compaction
L: Loss due to eviction of Feature maps
$\lambda$: Penalty Parameter According to the implementation of the Last/System Level Cache based on the mechanism as explained in the FIGS. 6A-11, the Last/System Level Cache mapping the DRAM for caching is performed as shown in FIG. 11.

Figure 12A:
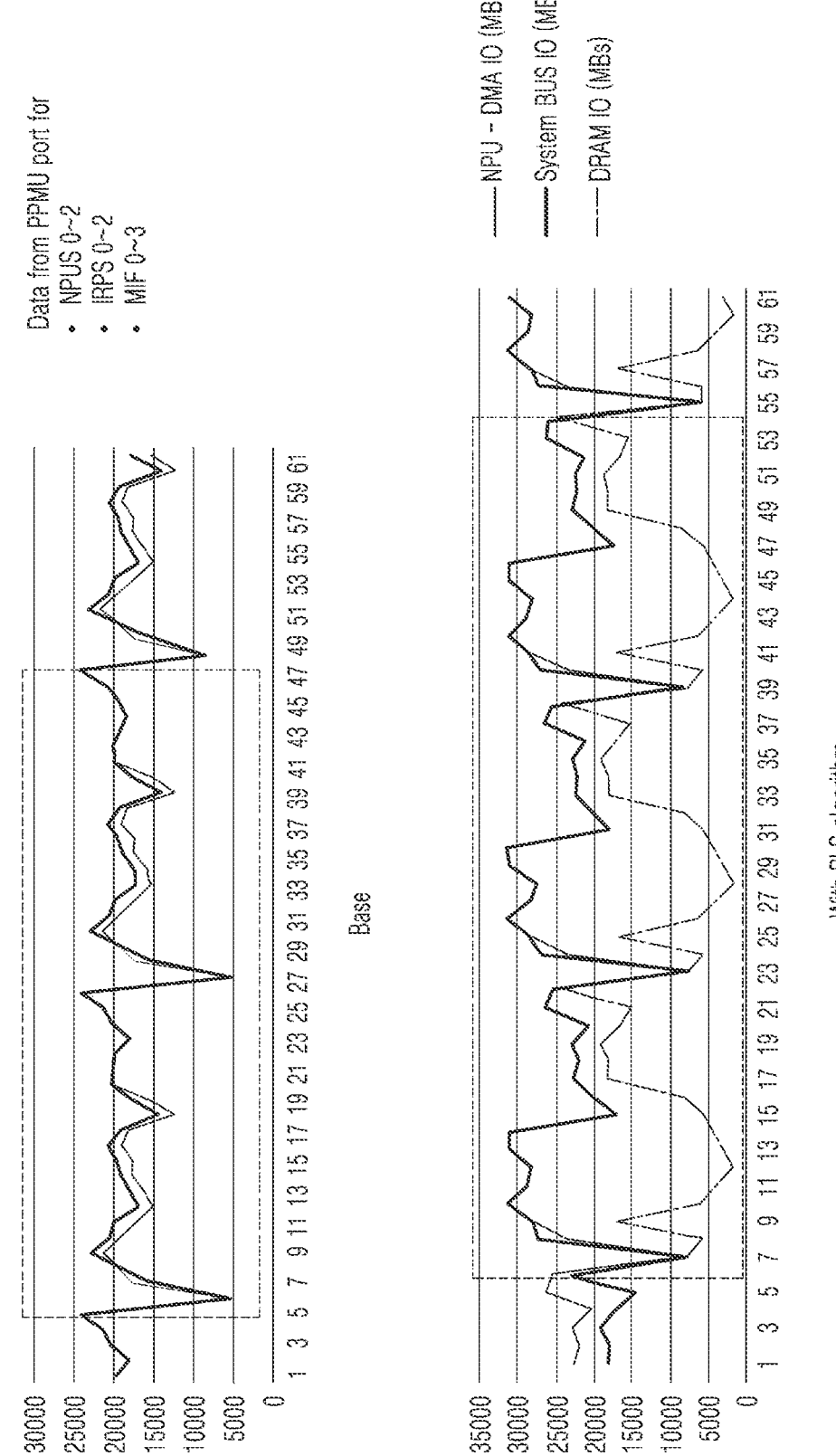
FIGS. 12A and 12B illustrate a comparative analysis of the DRAM traffic pattern between base i.e. without PLS algorithm and with PLS algorithm.
Figure 12B:
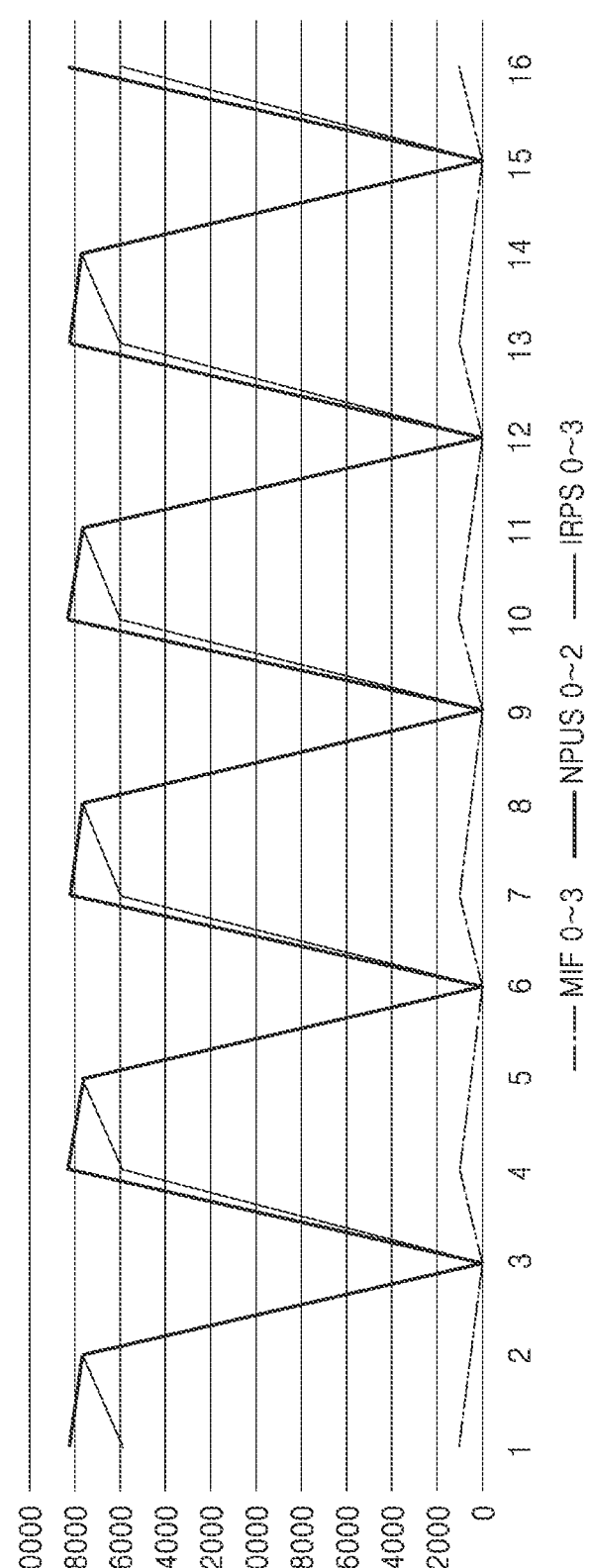
Figure 13:
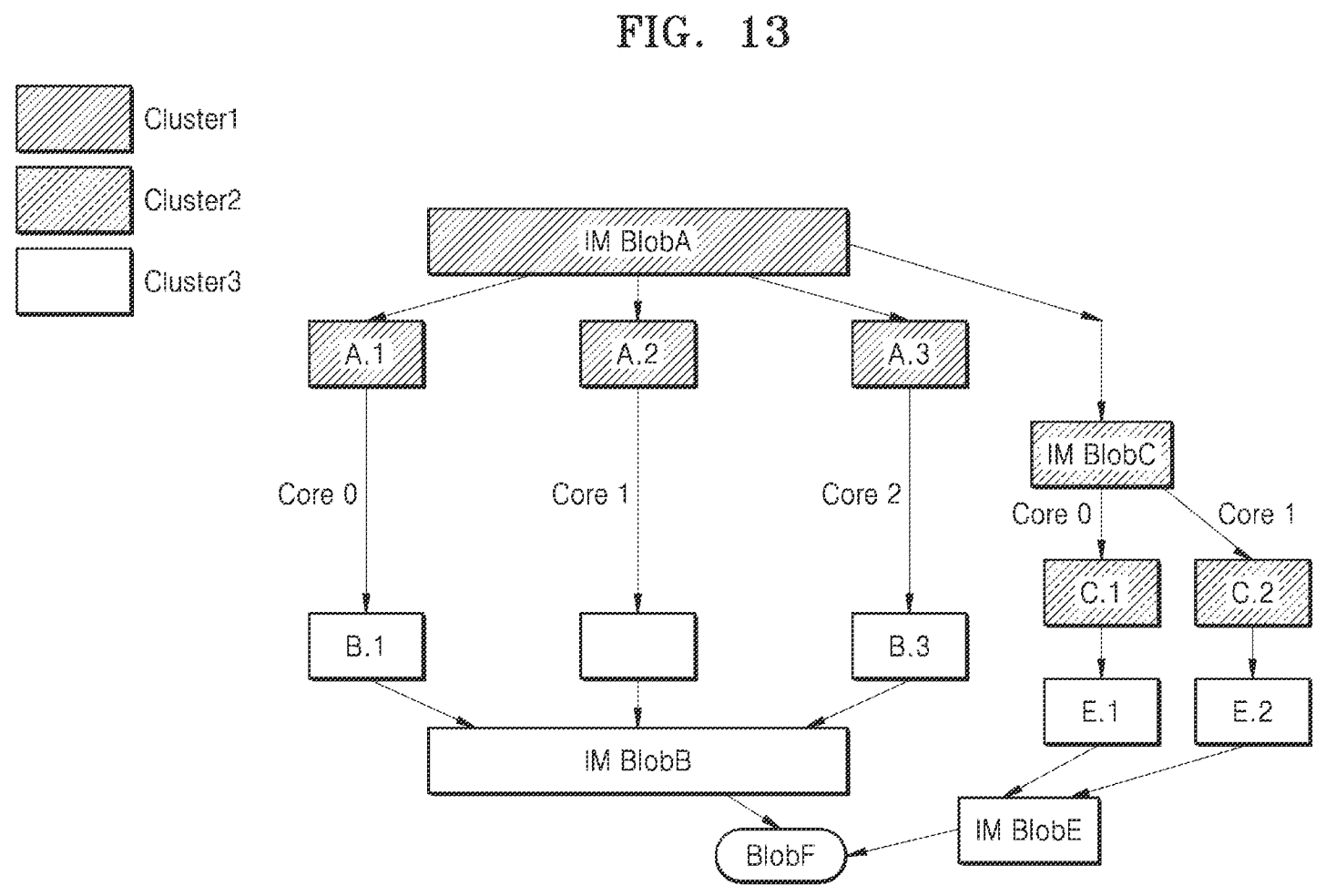

FIGS. 12A and 12B illustrates a comparative analysis of the DRAM traffic pattern between base i.e. without PLS algorithm and with PLS algorithm, according to an embodiment of the inventive concepts. FIG. 13 illustrates an exemplary scenario of cluster formation in a NPU core, according to an embodiment of the inventive concepts. Further, Table 7, Table 8, and Table 9 illustrates various results analysed for parameters like performance, power and memory print respectively. Further, Table 10 illustrates a comparison between linear scan and prioritized linear scan.

TABLE 7

Performance

| | | Performance | | | | | |
|---|---|---|---|---|---|---|---|
| | | FPS | | | DRAM Traffic@baseline FPS, GB/s | | |
| Scenario | NN | Baseline | with PLS | Percentage | Base | with PLS | Percentage |
| Benchmark Scenario (3xCore) (NPU got | InceptionV3 | 408 | 424 | 4 | 27.1 | 12.4 | 45.6 |
| exclusive priority, MO 128) | DeeplapV3 | 68 | 75 | 11 | 23.9 | 9.6 | 40.2 |
| Real | aic classifer | 59 | 69 | 17 | 6.6 | 1.0 | 14.6 |
| Scenario | aic detector | 61 | 70 | 14 | 5.0 | 0.5 | 10.8 |
| (NPU got | object detector | 85 | 92 | 8 | 3.1 | 1.3 | 42.8 |
| exclusive priority, | LF_segmenter_cnn | 78 | 96 | 24 | 7.7 | 0.7 | 8.6 |
| MO 11) | LF_segmenter_cnn_with depth | 63 | 74 | 18 | 7.2 | 1.0 | 13.5 |

TABLE 8

Power

| | | Power (MEM + MIF) mW | | |
|---|---|---|---|---|
| Scenario | NN | Baseline | with PLS | Percentage |
| Benchmark Scenario (3xCore) | InceptionV3 | 834.7 | 380.7 | 54.4 |
| (NPU got exclusive priority, MO 128) | DeeplapV3 | 735.9 | 296.1 | 59.8 |
| Real Scenario | aic classifer | 203.9 | 29.8 | 85.4 |
| (NPU got exclusive | aic detector | 152.6 | 16.5 | 89.2 |
| priority, MO 11) | object detector | 94.2 | 40.3 | 57.2 |
| | LF_segmenter_cnn | 236.4 | 20.3 | 91.4 |
| | LF_segmenter_cnn_with depth | 223.2 | 30.1 | 86.5 |

TABLE 9

| Memory Footprint | | | |
|---|---|---|---|
| NN | Base | w PLS | Percentage |
| InceptionV3 | 11.7 | 1.5 | 87.2 |
| DeeplapV3 | 134 | 22.8 | 83.0 |
| Flow-Net-S | 170 | 115 | 32.4 |
| NFD | 5 | 1.2 | 76.0 |
| ResNET50 | 17 | 4.5 | 73.5 |

TABLE 10

| | Linear Scan | Prioritised - Linear Scan |
|---|---|---|
| Memory type | Allocate variables in Fixed set of Registers | Allocate Data blobs in size-varying cacheable DRAM region |
| Precedence | Not evident | Graph Topology, execution schedule based precedence calculation |
| Maximisation | Utilisation of Registers | Memory Transfers from Cacheable region |
| Minimisation | Not allocation to registers | Cache Eviction |
| Complexity | Simple | Multi-dimensional problem |

Thus, the proposed mechanism provides the following, but not limited to, technical effect:

1. Performance: The present mechanism improves memory throughput using Last/System Level Cache and acceleration performance.
2. Power: The present mechanism increases Last/System Level Cache transactions, saving DRAM reduces overall power consumption.
3. Memory footprint: The present mechanism reduces the overall allocation required for intermediate Feature maps.
4. Adaptive: The present mechanism provides seamless support for Benchmark scenarios and Real-world scenarios (with varying Last/System Level Cache allocations).

Further, the present invention may be applied to TV, phone devices for inference on edge. The present mechanism offers scalability across servers and edge and beyond embedded systems also. Further, using specifically designed Neural Networks and a test environment with DRAM data may be tapped. NNs topology ensures specific priority for a feature Maps and controls of data is cacheable or not. Further, NN as per the state of the art cannot have DRAM re-use as all FMs need to exist till end. According to the present invention, based on data tapped at DRAM port, max size of LLC can be determined. Furthermore, present topology assigns highest precedence to dotted FMs, and ensures FM is allocated into the cacheable area. It uses similar features for FM clustering.

Some example embodiments disclosed herein may be implemented using processing circuitry. For example, some example embodiments disclosed herein may be implemented using at least one software program running on at least one hardware device and performing network management functions to control the elements.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for allocation of feature maps in a system cache in a dynamic random access memory (DRAM), the method comprising:
   receiving a plurality of input feature maps associated with a data at the system cache;
   creating a plurality of clusters of spatially co-located features maps of the plurality of input feature maps;
   calculating a priority of each cluster of the plurality of clusters based on one or more cluster parameters;
   placing the plurality of clusters in the DRAM based on an execution order and calculated priorities of each cluster of the plurality of clusters to obtain a plurality of prioritized clusters;
   assigning a respective first address in the DRAM to each prioritized cluster of the plurality of prioritized clusters;
   determining an overlap of address assignments of consecutive clusters among the plurality of prioritized clusters based on a conflict of life parameter; and
   reassigning a respective second address in the DRAM to each prioritized cluster of the plurality of prioritized clusters based on a result of determining the overlap and calculating the priority of each cluster of the plurality of clusters.

2. The method as claimed in the claim 1, further comprising:
   determining a life of each cluster of the plurality of clusters based on an execution order of each input feature map of the input feature maps; and determining the conflict of life parameter in each respective first address and each respective second address based on the determined life of each cluster of the plurality of clusters.

3. The method as claimed in the claim 2, wherein the one or more cluster parameters comprises at least one of a cluster size, a cluster access frequency, and cluster life.

4. The method as claimed in the claim 1, further comprising:

parsing the plurality of clusters; and sorting the plurality of clusters, wherein the respective first address of each prioritized cluster of the plurality of prioritized clusters is assigned to a lower order address near to a zero offset in the DRAM, and wherein the plurality of clusters other than the plurality of the prioritized clusters are assigned to a higher order address in the DRAM.

5. The method as claimed in the claim 2, wherein after determining the conflict of life parameter, the method comprises:

determining a priority of the plurality of prioritized clusters;

based on a result of the determination of the priority of the plurality of prioritized clusters, wherein reassigning the respective second address to each prioritized cluster of the plurality of prioritized clusters, comprises at least one of:

assigning a plurality of clusters having a highest priority to a lower order address near to a zero offset in the DRAM;

assigning a plurality of clusters having a low priority to a higher order address in the DRAM; and assigning a plurality of clusters having mid priority to a middle order address in the DRAM.

6. A neural network (NN) system, for allocation of a feature map in a system cache of a dynamic random access memory (DRAM), and the system cache is communicatively coupled with the DRAM, the NN system comprising at least one processor configured to:

receive a plurality of input feature maps associated with a data at the system cache;

create a plurality of clusters of spatially co-located features maps of the plurality of input feature maps;

calculate a priority of each cluster of the plurality of clusters based on one or more cluster parameters;

place the plurality of clusters in the DRAM based on an execution order and calculated priorities of each cluster of the plurality of clusters to obtain a plurality of prioritized clusters;

assign a respective first address in the DRAM to each prioritized cluster of the plurality of prioritized clusters;

determine an overlap of address assignments of consecutive clusters among the plurality of prioritized clusters based on a conflict of life parameter; and reassign a respective second address in the DRAM to each prioritized cluster of the plurality of prioritized clusters based on a result of determining the overlap and calculating the priority of each cluster of the plurality of clusters.

7. The NN system as claimed in the claim 6, wherein the at least one processor is further configured to:

determine a life of each cluster of the plurality of clusters based on an execution order of each input feature map of the input feature maps; and determine the conflict of life parameter in each respective first address and each respective second address based on the determined life of each cluster of the plurality of clusters.

8. The NN system as claimed in the claim 7, wherein the one or more cluster parameters comprises at least one of a cluster size, a cluster access frequency, and cluster life.

9. The NN system as claimed in the claim 6, wherein the at least one processor is further configured to:

parse the plurality of clusters; and sort the plurality of clusters, wherein the respective first address of each prioritized cluster of the plurality of prioritized clusters is assigned to a lower order address near to a zero offset in the DRAM, and wherein the plurality of clusters other than the plurality of prioritized clusters are assigned to a higher order address in the DRAM.

10. The NN system as claimed in the claim 7, wherein after determining the conflict of life parameter, the at least one processor is further configured to:

determine a priority of the plurality of prioritized clusters;

based on a result of the determination of the priority of the plurality of prioritized clusters, wherein reassigning the respective second address to each prioritized cluster of the plurality of prioritized clusters, comprises at least one of:

assigning a plurality of clusters having a highest priority to a lower order address near to a zero offset in the DRAM;

assigning a plurality of clusters having a low priority to a higher order address in the DRAM; and assigning a plurality of clusters having mid priority to a middle order address in the DRAM based on a result of the determination of the priority of the prioritized plurality of the clusters, the reassigning of the second address to each of the prioritized plurality of the clusters, comprises at least one of:

assigning a plurality of clusters having a highest priority to a lower order address near to a zero offset in the DRAM;

assigning a plurality of clusters having a low priority to a higher order address in the DRAM; and assigning a plurality of clusters having mid priority to a middle order address in the DRAM.

* * * * *